United States Patent [19]
Zittel et al.

[11] Patent Number: 6,047,811
[45] Date of Patent: Apr. 11, 2000

[54] METHOD AND VIBRATORY CONVEYOR

[75] Inventors: David R. Zittel, 155 Oak Grove Dr., Columbus, Wis. 53925; Steven B. Malchow, Lake Mills, Wis.

[73] Assignee: David R. Zittel, Columbus, Wis.

[21] Appl. No.: 08/916,057

[22] Filed: Aug. 21, 1997

[51] Int. Cl.⁷ .................................................. B65G 27/08
[52] U.S. Cl. ...................... 198/763; 198/771; 198/752.1
[58] Field of Search ................................ 198/752.1, 754, 198/763, 771

[56] References Cited

U.S. PATENT DOCUMENTS

| | | | |
|---|---|---|---|
| 3,045,810 | 7/1962 | Holt ........................................ | 198/763 |
| 3,223,024 | 12/1965 | Benson et al. . | |
| 3,276,065 | 10/1966 | King, Jr. et al. . | |
| 3,793,937 | 2/1974 | Lipoma . | |
| 3,968,818 | 7/1976 | Gerrans . | |
| 4,198,725 | 4/1980 | Trutzschler . | |
| 4,251,895 | 2/1981 | Caridis et al. . | |
| 4,260,052 | 4/1981 | Brown .................................... | 198/763 |
| 4,372,200 | 2/1983 | Caridis et al. . | |
| 4,438,977 | 3/1984 | Chapel . | |
| 4,477,287 | 10/1984 | Kush et al. . | |
| 4,549,478 | 10/1985 | Entes . | |
| 4,670,936 | 6/1987 | Hanson . | |
| 4,676,006 | 6/1987 | Tolson . | |
| 4,738,193 | 4/1988 | Benson et al. . | |
| 4,942,810 | 7/1990 | Zittel et al. . | |
| 5,097,755 | 3/1992 | Hill . | |
| 5,174,829 | 12/1992 | Gray . | |
| 5,184,716 | 2/1993 | Gaines ................................ | 198/771 X |
| 5,287,586 | 2/1994 | Dentzau . | |
| 5,425,308 | 6/1995 | Dickerson et al. . | |
| 5,462,155 | 10/1995 | Demas et al. ..................... | 198/752.1 X |
| 5,517,906 | 5/1996 | Zittel et al. . | |
| 5,602,433 | 2/1997 | Brence et al. .................... | 198/752.1 X |
| 5,868,241 | 2/1999 | Pellegrino ............................... | 198/763 |

OTHER PUBLICATIONS

Lyco Manufacturing, Inc. 2–sided color brochure for Vibratory Conveyor (Mechanical), Mar. 1996.

*Primary Examiner*—James R. Bidwell
*Attorney, Agent, or Firm*—Nilles & Nilles, S.C.

[57] ABSTRACT

A vibratory conveyor and method of making the conveyor having a frame to which a locator sheet having accurately punched and shaped locator holes for locating spring mounts fixed to the frame. Each mount preferably is a plug having corners which engage notches of one of the holes to accurately locate the plug. Each hole also has a portion which extends beyond the periphery of the plug to expose the frame so that the plug can be welded to the frame. After welding, a protective washer is slipped over each plug and welded to the plug and sheet. When located and fixed in this manner, each mount is located relative to one end of the conveyor, angularly located, and horizontally located. The sheet or another locator sheet can also have other holes to locate other conveyor components such as cross tubes, braces, and the conveyor drive. Each sheet preferably is constructed of corrosion resistant cladding for enabling a less corrosion resistant material to be used for the frame. The conveyor pan is constructed from a blank that is sheared and punched to unitarily form locators that locate spring mounts. In one pan embodiment, the locator is the mount which comprises a tab punched from the pan, bent to the desired angle, and fixed to the pan preferably by welding. In another embodiment, the locators are dimples or holes in the pan for locating mounts that preferably are plugs welded to the pan after being located.

49 Claims, 14 Drawing Sheets

FIG. 2

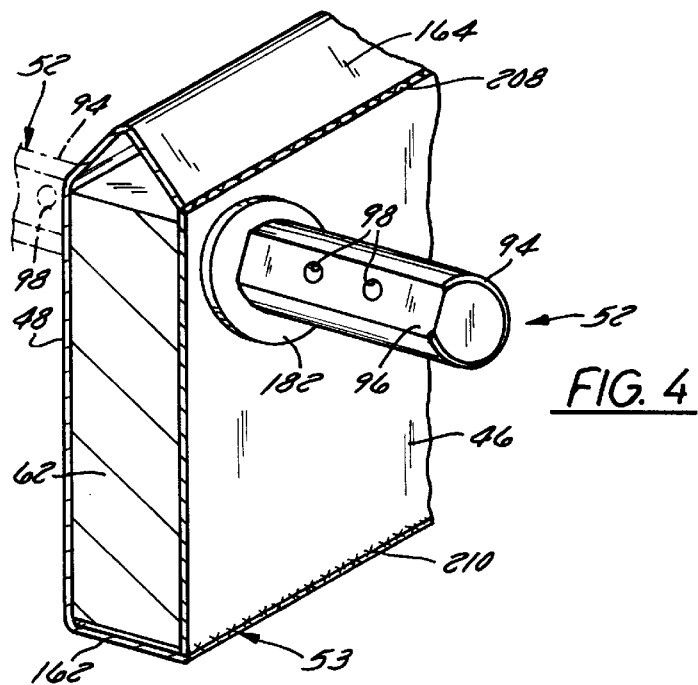
FIG. 4
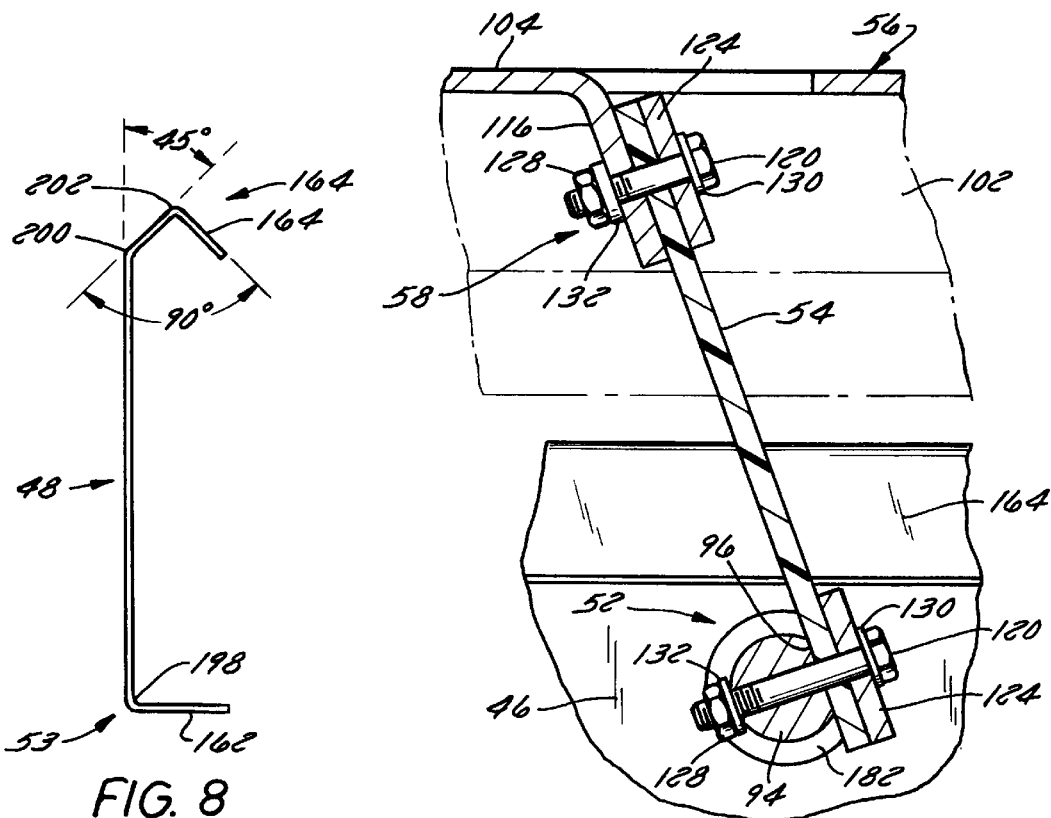
FIG. 8
FIG. 5

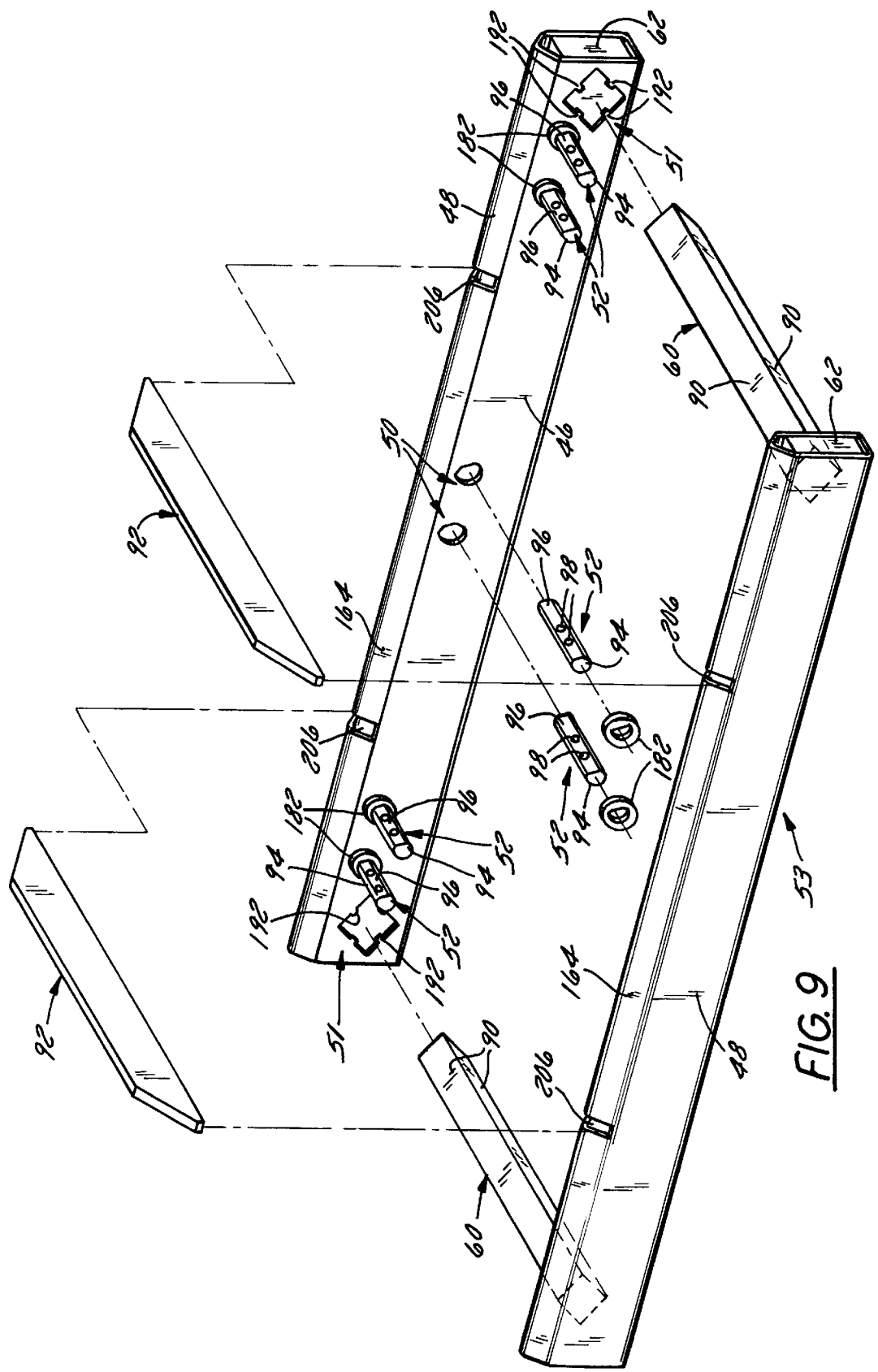

METHOD AND VIBRATORY CONVEYOR

FIELD OF THE INVENTION

The present invention relates to vibratory conveyors and more particularly to a vibratory conveyor and method of making the same where the mounts which hold springs supporting a pan of the conveyor are accurately located resulting in a smoother, better balanced conveyor which minimizes unbalanced loading of the springs, extending spring life and minimizing maintenance.

BACKGROUND OF THE INVENTION

Vibratory conveyors have long been used for transporting particulate matter. While having many uses, vibratory conveyors have been particularly widely used in the food processing industry where they are typically used to convey dry particulate food product, such as rice, grain and pasta, as well as food product in pouches, along the length of the conveyor pan. In the past, the frames of vibratory conveyors have been made of expensive stainless steel for corrosion resistance and easy cleaning. While corrosion resistant cladding has been used in the past to protect food processing equipment having frames made of mild steel, including conveyors, it is believed that such cladding has not heretofore been used to accurately locate components of a vibratory conveyor.

Vibratory conveyors are constructed with an elongate metal pan carried by leaf springs that extend upwardly from a frame carried by a heavy metal base. The pan is three dimensionally contoured having a recessed flat bed with a sidewall along each side of the bed. Extending outwardly from each sidewall is a flat wing and each wing has a downturned downwardly extending flange. An electromagnetic or electromechanical drive attached to the frame is coupled to the pan to vibrate the pan relative to the base. For food applications, the pan is typically vibrated between about 500 and about 1000 cycles per minute with the direction of pan movement generally parallel to the lengthwise axis of the pan.

In assembly, the base is made by joining together a pair of parallel but spaced apart elongate stainless steel beams with a plurality of transversely extending stainless steel cross braces that extend from one beam to the other beam. These cross braces also serve as spring mounts to which the springs that carry the pan are attached. During assembly, the location of each brace is determined manually relative to one end of the beams in an attempt to locate the brace before one end of each brace end is welded to one beam and the other end of each brace is welded to the other beam. Thereafter, pairs of spaced apart leaf springs are attached to each spring mounting brace with one spring of each pair attached to the brace adjacent one of the beams and the other spring of each pair attached to the brace adjacent the other of the beams.

After attaching the springs, the pan is lifted over the springs such that the springs are positioned underneath the wings, between the sidewalls and downturned flanges, and the location of the springs are manually marked. The location of the springs relative to the pan are manually marked and spring mounting brackets are welded to the pan between the sidewalls and downturned flanges.

When manually locating each of the spring mounts, namely the braces and brackets, the intended goal is to locate the springs accurately (a) relative to a common end of the conveyor, (b) relative to a common horizontal plane, (c) relative to a common vertical plane, and (d) angularly. Unfortunately, because all of these spring mounts are manually located, slight mislocation and misalignment of one or more springs often occurs.

This can result in the springs being at least slightly mislocated angularly, relative to one end of the conveyor, and/or relative to the desired horizontal or vertical plane. As a result, forces encountered during normal conveyor operation can undesirably twist the spring, compress the spring, bend the spring too far in one direction, bend the spring without any load applied to the pan, or pull the spring, all of which can lead to spring fatigue, rough conveyor operation, and spring failure all of which typically necessitates conveyor maintenance. Even worse, because the spring mounts are permanently fixed because they are welded, the mislocation and misalignment can be permanent or remain undetected, typically causing a failed spring's replacement also to fail prematurely resulting in increased warranty costs and significantly increased maintenance expenses over the life of the conveyor. If detected, it is extremely time consuming and expensive to remove a bracket or brace spring mount, re-locate it, and re-weld it.

The drive is mounted on a bracket fixed to the frame and coupled to the pan, typically by at least one leaf-type spring. If the drive is mislocated relative to the frame or pan, it can result in rough operation of the conveyor. Unfortunately, if any of the springs supporting the pan are mislocated or if the drive is mislocated, it can adversely impact the desired relationship between the natural frequency of the pan, the natural frequency of the springs and the natural frequency of the drive quite possibly causing the conveyor to be undesirably excited into resonance during operation. This can lead to such rough conveyor operation that the drive can be damaged, springs can fracture, spring mounts can be torn from the frame and the drive mounting bracket can fail, all of which will leave the conveyor inoperable and require expensive, time consuming maintenance.

What is needed is a vibratory conveyor and method of making the conveyor that accurately locates the spring mounts so that twisting, excessive bending, compressing and pulling of any spring of the conveyor is minimized and preferably substantially completely prevented. What is also needed is a method of making a vibratory conveyor that enables the spring mounts to be quickly and accurately located during assembly without requiring the assemblers to manually locate any spring mount. What is also needed is a conveyor that is not excited into resonance during operation. What is still further needed is a vibratory conveyor and method of assembly that is fast, simple, economical, saves labor, and which results in a conveyor of strong, robust and durable construction.

SUMMARY OF THE INVENTION

A vibratory conveyor and method of making the conveyor having a frame covered with cladding punched with locators for spring mounts to which springs are attached that support a three dimensionally formed pan having prepunched accurately located spring mount locators. By punching the locators, the spring mounts are all accurately located (a) relative to one end of the conveyor, (b) along a common horizontal plane, (c) along a common vertical plane, and (d) angularly, all to help ensure that each row of springs attached to the mounts are vertically and horizontally aligned, parallel when unloaded, not twisted, not skewed at any angle relative to any spring's longitudinal axis, and possess a uniform natural frequency minimizing spring failure and conveyor maintenance. Additionally, the cladding has locators which accurately locate cross beams of the frame as well as a drive of the conveyor to help ensure that all conveyor components are accurately located such that the conveyor is not excited into resonance during operation. While the cladding preferably provides protection to the frame, where protection is not required the cladding can simply provide location to the aforementioned components mounted to the frame.

The conveyor includes a frame supported by and preferably isolated from a base having legs resting on the floor. The frame comprises at least one elongate support beam to which components of the conveyor, including spring mounts, cross tubes, and conveyor drive are mounted. Preferably, the cladding comprises a locator sheet constructed of a material that preferably also shields and protects the beam from corrosion. Spring mounts accurately located by holes punched in the locator sheet are attached directly to the beam and, in turn, springs that preferably are leaf-type springs constructed from fiberglass are attached to and extend upwardly from each mount. The pan has accurately located spring mounts punched from the pan to which each spring is attached such that the pan is supported on the springs. The conveyor drive is accurately located on the frame by other locator holes punched in another locator sheet of the cladding. The drive preferably is an electromechanical or electromagnetic drive carried by the frame that oscillates the pan slightly upwardly and back and forth during operation to move product in the pan along the pan.

During construction of the spring mount locator sheet, the sheet is punched to accurately locate spaced apart spring mount locator holes relative to one end of the sheet and preferably also relative to a top or bottom edge of the sheet so that when assembled the spring mounts are accurately located on the frame. Where the conveyor frame comprises a pair of spaced apart elongate support beams, each beam is clad in a locator sheet that preferably has additional punched and spaced locator holes for accurately locating at least two spaced apart cross tubes joining the beams such that the cross tubes are aligned and accurately located relative to a common end of the conveyor as well as accurately located along a common horizontal plane. Where the conveyor frame comprises a pair of support beams, the cladding of each beam comprises an inner locator sheet having the locator holes for the spring mounts and cross tubes and an outer locator sheet having locator holes for accurately locating the drive, which is carried by the beams. Preferably, each pair of inner and outer locator sheets are fixed to the beam by welding along the top and bottom edges of the sheets. Where the conveyor frame comprises a single elongate beam, such as is typically the case for conveyors using an electromagnetic drive, the spring mounts extend outwardly from both sides of the beam necessitating the use of a locator sheet on each side of the beam.

In the making of a locator sheet, the sheet is first sheared to size, punched, bent, if necessary, and thereafter fixed to a beam preferably by welding. It is during the punching process that the locator holes are formed. For the spring mount sheet, all of the spring mount locator holes lie along a common line on the sheet, are accurately located relative to one end of the sheet, preferably being located within at least 0.010 inches, preferably about 0.005 inches, of the end and a top or bottom edge of the sheet. Each spring mount locator hole is of a shape generally complementary to the end cross sectional shape of the spring mount, the mount preferably being a plug having a generally D-shaped cross section.

The preferred plug is elongate and generally cylindrical with a cast or milled flat spring mounting surface that terminates in locator corners formed where each edge of the surface converges with the rounded portion of the plug. Each spring mount locator hole of each spring mount locator sheet has (1) a straight edge complementary to the spring mount surface of the plug, and (2) a curved edge of a radius greater than the curved portion of the plug for exposing a portion of the underlying beam so that during assembly the plug can be welded directly to the beam. Two locator notches are formed at the corners of each locator hole where the straight and curved edges of the hole converge. During assembly with the spring mount locator sheet fixed to one of the beams, each plug is accurately located by one of the locator holes by each locator corner of the plug being received in a locator notch of the hole with the flat spring mount surface of the plug bearing against the straight edge of the hole. In addition to the locator hole accurately locating the plugs relative to the pan, the locator notches and straight edge of the hole also accurately angularly locate the spring mounting surface of each plug so each spring will be positioned at the same desired angle when assembled to the mount.

In the manufacture of the pan, the pan is sheared to size from a blank and thereafter punched to form at least two spaced apart rows of spaced apart spring mounts. In one preferred pan embodiment, the spring mounts are punched in the region that becomes outwardly extending wings of the pan after forming takes place, resulting in two rows of accurately aligned spaced apart mounts. In this preferred pan embodiment, the spring mounts are generally rectangular tabs which are bent after punching downwardly in unison at the same angle between the pan sidewall and an adjacent downturned flange extending downwardly from the wing to ensure that springs mounted to them will all be accurately located relative to one end of the pan, accurately aligned horizontally, and be disposed at the same angle.

In another preferred pan embodiment, spring mount locators are punched in the pan rather than spring mounts. The spring mount locators are punched holes or dimples which are each constructed to receive and retain a spring mounting plug or generally cylindrical spring mounting dowel while also providing accurate alignment and location. A pan constructed in this manner has at least two and can have as many as four spaced apart rows of spaced apart spring mount locators with a row of locators disposed along each pan sidewall and can have another row disposed along each downturned flange. Where the pan is formed having pairs of opposed locators, each locator in a sidewall is aligned with a locator in the adjacent downturned flange such that the spring mount can be received by and between the aligned locator pair. After being positioned between an aligned pair of locators, the spring mount preferably is immovably fixed to the pan by welding it to both the sidewall and adjacent flange of the pan.

Preferably, the pan can be constructed with only a single row of spring mount locator holes in each flange or each sidewall. In assembly, the spring mount is inserted through the locator until it bears against the pan and welded to the pan at both ends.

In assembly, a locator sheet is attached to each beam of the frame. Spring mount plugs are positioned with their ends each received in a locator hole and welded directly to the beam. A washer is slipped over each plug, urged against the sheet, welded to the sheet and to the plug to seal and protect the underlying weld attaching the plug to the beam. Springs are each attached to a plug by being clamped tightly between a clamp plate and the flat spring mounting surface of the plug with fasteners urging the clamp plate and spring against the plug. After attaching the springs, the pan is maneuvered over the springs such that there is a spring mount disposed adjacent each spring. Each spring is attached to a spring mount of the pan preferably by being clamped between a plate and the mount thereby supporting the pan on the springs and readying the conveyor for operation.

Objects, features and advantages of the invention are to provide a method of making a vibratory conveyor that is simple; results in accurately located and aligned springs minimizing spring fatigue, spring failure and conveyor maintenance; results in accurately located conveyor components for constraining natural frequencies of the spring, pan, and drive within a desired range thereby preventing the conveyor from being excited into resonance during operation; produces a conveyor that is better balanced minimizing electromechanical drive bearing stress and heat prolonging bearing life; utilizes cladding applied to the conveyor frame to protect the frame to also economically accurately locate frame spring mounts and other conveyor components while allowing the use of less expensive mild steel for components of the conveyor which provide structural support; efficiently and economically integrally forms the pan spring mount locators from the pan saving time, and material; minimizes the amount of time and labor required to locate and attach each spring mount and other conveyor component; reduces the amount of labor to make such a conveyor by between about 50% and about 75%; is versatile in that the cladding and manufacturing method can be used to make vibratory conveyors having a single elongate mild steel support beam frame supporting a pan driven by an electromagnetic conveyor, vibratory conveyors having frame comprised of a pair of spaced apart and parallel mild steel support beams, as well as vibratory conveyors having a generally Z-shaped frame comprised of mild steel beams welded and clad; eliminates measurement errors because spring mount location is not manually measured; results in all of the spring mounts quickly and economically being punched simultaneously resulting in their accurate location relative to the conveyor as well as to each other; and produces a vibratory conveyor that is rugged, simple, flexible, reliable, and durable, and which is of economical manufacture and which is easy to make, assemble and use.

BRIEF DESCRIPTION OF THE DRAWINGS

These and other objects, features, and advantages of this invention will become apparent from the following detailed description of the best mode, appended claims, and accompanying drawings in which:

FIG. 2 illustrates a cross sectional side view of the conveyor showing the arrangement of the springs and drive system for oscillating the pan back and forth on the springs;

FIG. 4 is a fragmentary perspective cross sectional view of a portion of one beam of the frame showing cladding encompassing the beam and a preferred spring mount construction cantilevered outwardly from the beam and cladding;

FIG. 5 is a fragmentary cross sectional view taken through the pan spring mount, frame spring mount, spring and mounting hardware;

FIG. 8 shows the outer sheet after forming;

FIG. 9 is a partially exploded perspective view of the conveyor frame;

DETAILED DESCRIPTION OF THE INVENTION

Figure 1:
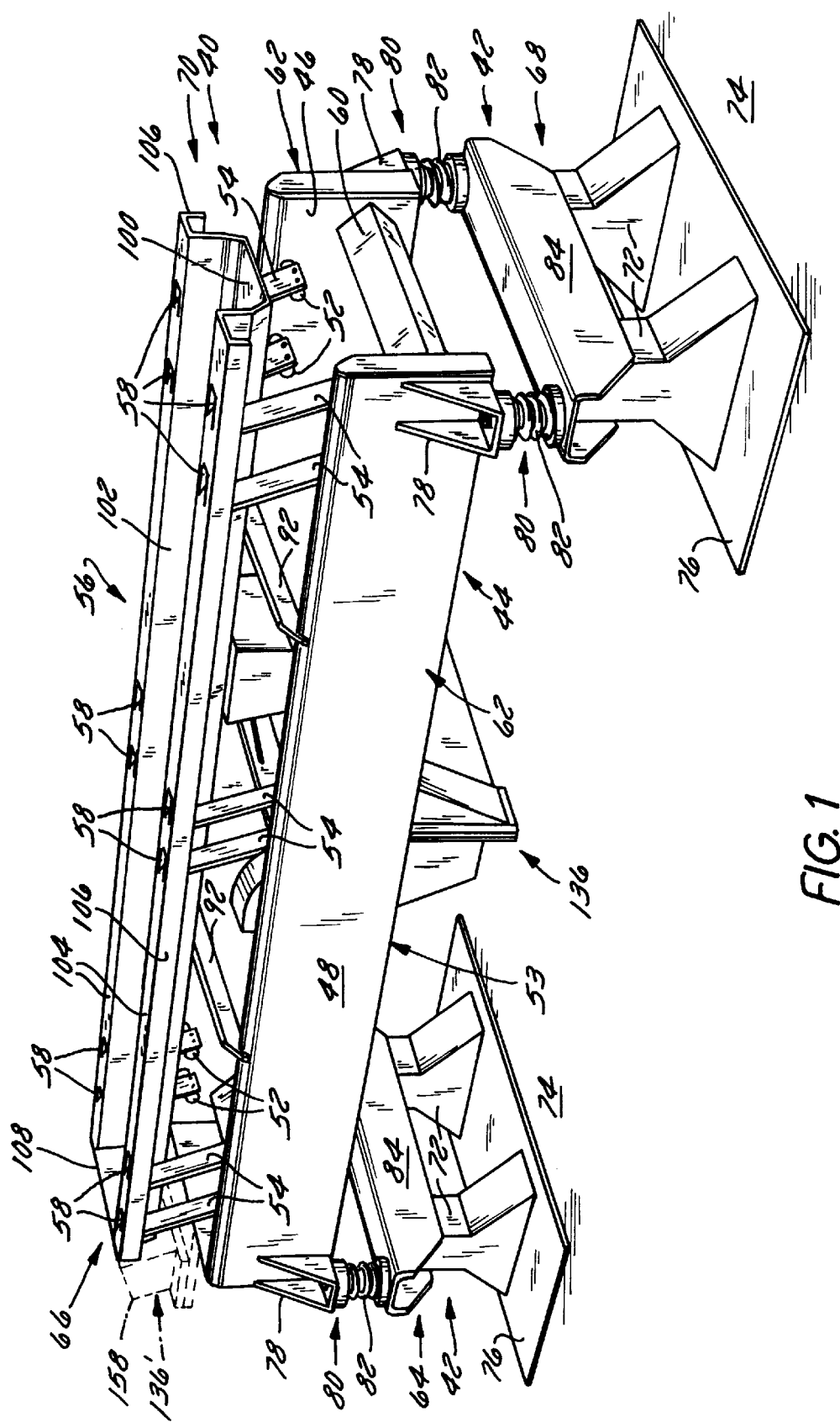
FIG. 1 illustrates a vibratory conveyor of this invention having cladding surrounding the frame punched with locator holes for accurately locating spring mounts attached to the frame and a conveyor pan with spring mounts formed from the pan to accurately locate them.

FIGS. 1–5 illustrate a vibratory conveyor 40 of this invention having a base 42 carrying a frame 44 covered in cladding 53 having pre-punched locators 50 for accurately locating spring mounts 52 that support on springs 54 a conveyor pan 56 having punched and formed spring mount locators 58. The locators 50 & 58 minimize and virtually completely prevent spring mislocation and misalignment for producing a conveyor 40 that operates more smoothly with less spring wear and tear thereby minimizing spring failure and conveyor maintenance. Advantageously, the cladding 53 can have other punched locators 51 used to locate other conveyor components, such as preferably cross-tubes 60 which join together a pair of support beams 62 of the frame 44.

Figure 3:
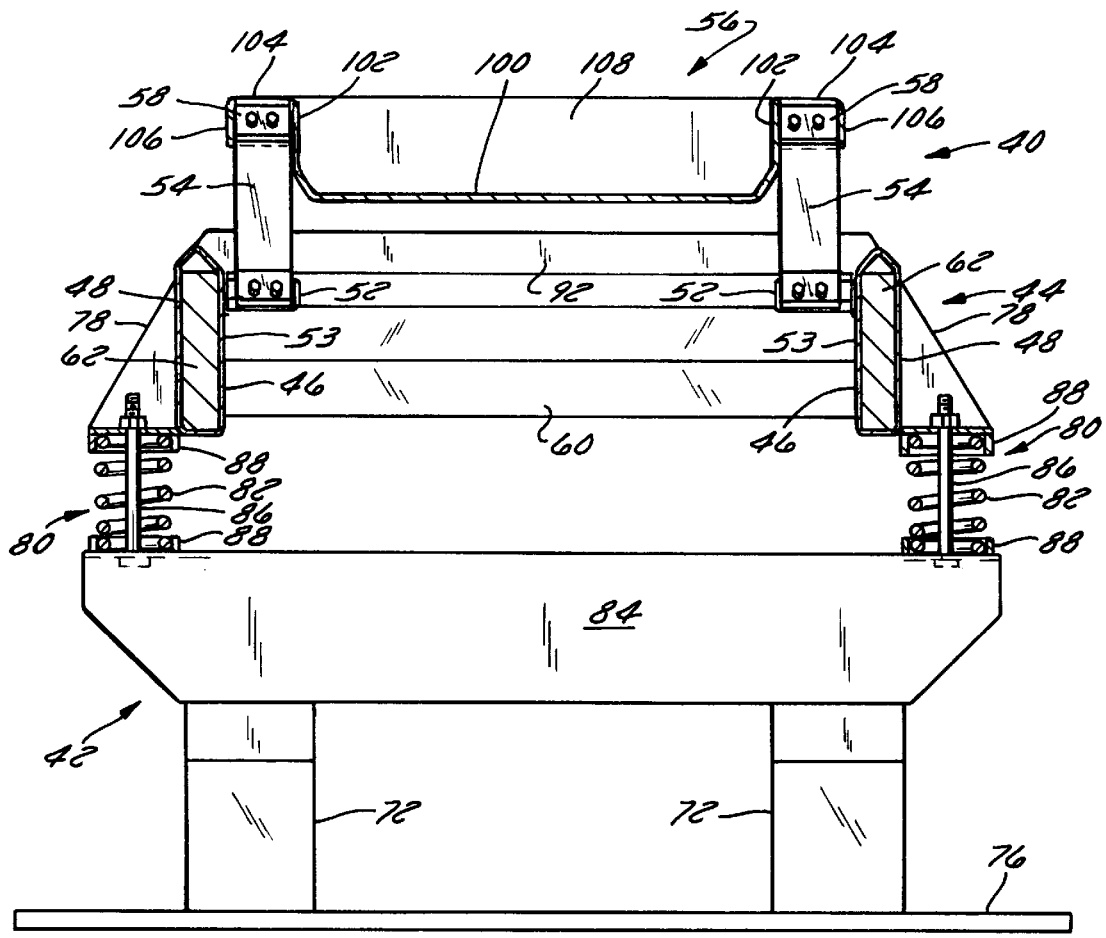
FIG. 3 shows a cross sectional front view of the conveyor showing how the conveyor frame is carried by and isolated from the frame.

The frame 44 is carried by a portion 64 of the base 42 adjacent the conveyor inlet 66 and another portion 68 of the base 42 adjacent the conveyor outlet 70. Each base portion 64 & 68 has a pair of legs 72 which rest on the floor 74. Between the floor 74 and each base portion 64 & 68 is a metal support panel 76 preferably for more evenly distributing the weight of the conveyor 40 on the floor 74. The inlet base portion 64 can be constructed with legs 72 longer than the legs 72 of the outlet base portion 68 to somewhat slightly tilt the pan 56 downwardly from the inlet end 66 toward the outlet 70 to help facilitate movement of product being conveyed by the conveyor 40. Whether or not the legs 72 provide the desired tilt, the conveyor 40 is preferably constructed such that its pan 56 is at least slightly downwardly tilted in the direction of the outlet 70. Each support beam 62 preferably is constructed of steel that preferably is a mild steel. Each beam 62 has square ends and corners to facilitate accurate location of a pair of sheets 46 & 48 that make up the cladding 53 around the beam 62. Located at each end of each beam 62 to minimize the transmission of conveyor vibration to the base 42, each beam 62 has an outwardly extending bracket 78 which rests on an isolator 80 that preferably is a coil compression spring 82 captured between the bracket 78 and a cross beam 84 of the base 42. Referring to FIG. 3, to retain each spring 82, a tie rod 86 received through the center of the spring 80 connects the bracket 78 and cross beam 84. Each bracket 78 and cross beam 84 have circular flanges 88 which encompass an end of each spring 82 to constrain radial movement of the spring 82 relative to the tie rod 86 for helping to keep the spring 82 in contact with the bracket 78 and cross beam 84 at all times.

Figure 14:
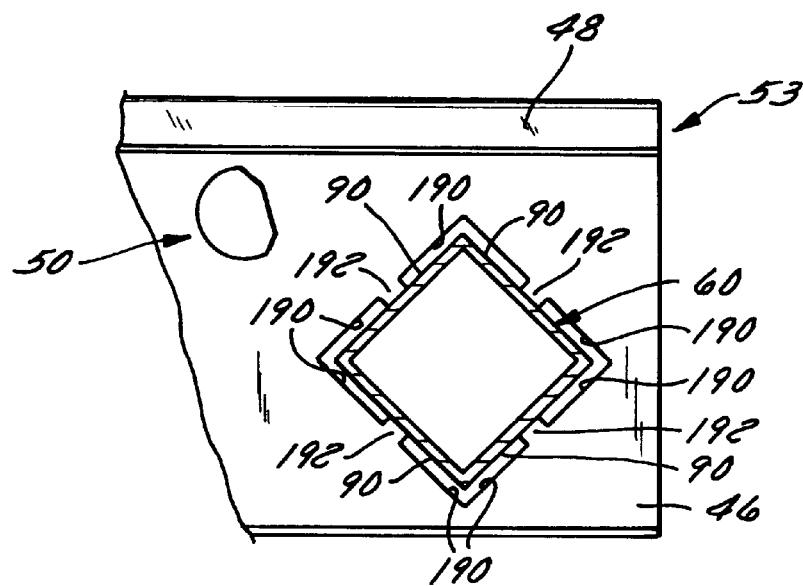
FIG. 14 is a cross sectional view of a cross tube joining the support beams of the conveyor frame illustrating a locator hole in the locator sheet with locator fingers for each bearing against a sidewall of the tube to locate the tube.

The conveyor 40 has a cross tube 60 at each end which joins together and spaces apart the support beams 62. The cross tubes 60 preferably are hollow, as is depicted in FIG. 14, and have four sidewalls 90 arranged in a rectangular or square cross sectional configuration, although one or both tubes 60 can be of solid construction if desired. While the tubes 60 impart structural rigidity to the frame 44, a pair of spaced apart upper cross braces 92 that each extend from one beam 62 to the other beam 62 help to further structurally stiffen the frame 44. Depending upon the length and construction of the conveyor 40, more than two such cross braces 92 can be used.

Referring more specifically to FIGS. 4 & 5, extending outwardly from each beam 62 toward the other beam 62 are a plurality of spaced apart spring mounting plugs 94 that serve as spring mounts 52. Each plug 94 is generally cylindrical, sticks outwardly at least a few inches from the beam 62 it is attached to, preferably terminates before reaching the other beam 62, and has a flat cast or milled spring mounting surface 96 that extends longitudinally substantially the length of each plug 94. Each D-shaped plug 94 preferably is constructed of a rust-resistant material that preferably is a stainless steel. To enable a spring 54 to be mounted to each plug 94, each plug 94 has a pair of spaced apart through bores 98 that each extend from the mounting surface 96 completely through the plug 94.

The conveyor pan 56 is shown in FIGS. 1–3 & 20 and preferably is of one piece unitary construction, although the pan 56 can be comprised of two or more sheets of material welded together to form the pan 56. As is shown more clearly in FIG. 3, the three dimensionally contoured pan 56 has a bed 100 of generally flat and relatively smooth construction for receiving and facilitating transport of product to be moved by the conveyor 40. The pan 56 has a sidewall 102 along each side of the bed 100 for keeping product on the bed 100. Extending outwardly from each sidewall 102 is a wing 104 having a downturned flange 106 extending downwardly from the wing 104. At the inlet end 66, the pan 56 has an end wall 108.

Figure 16:
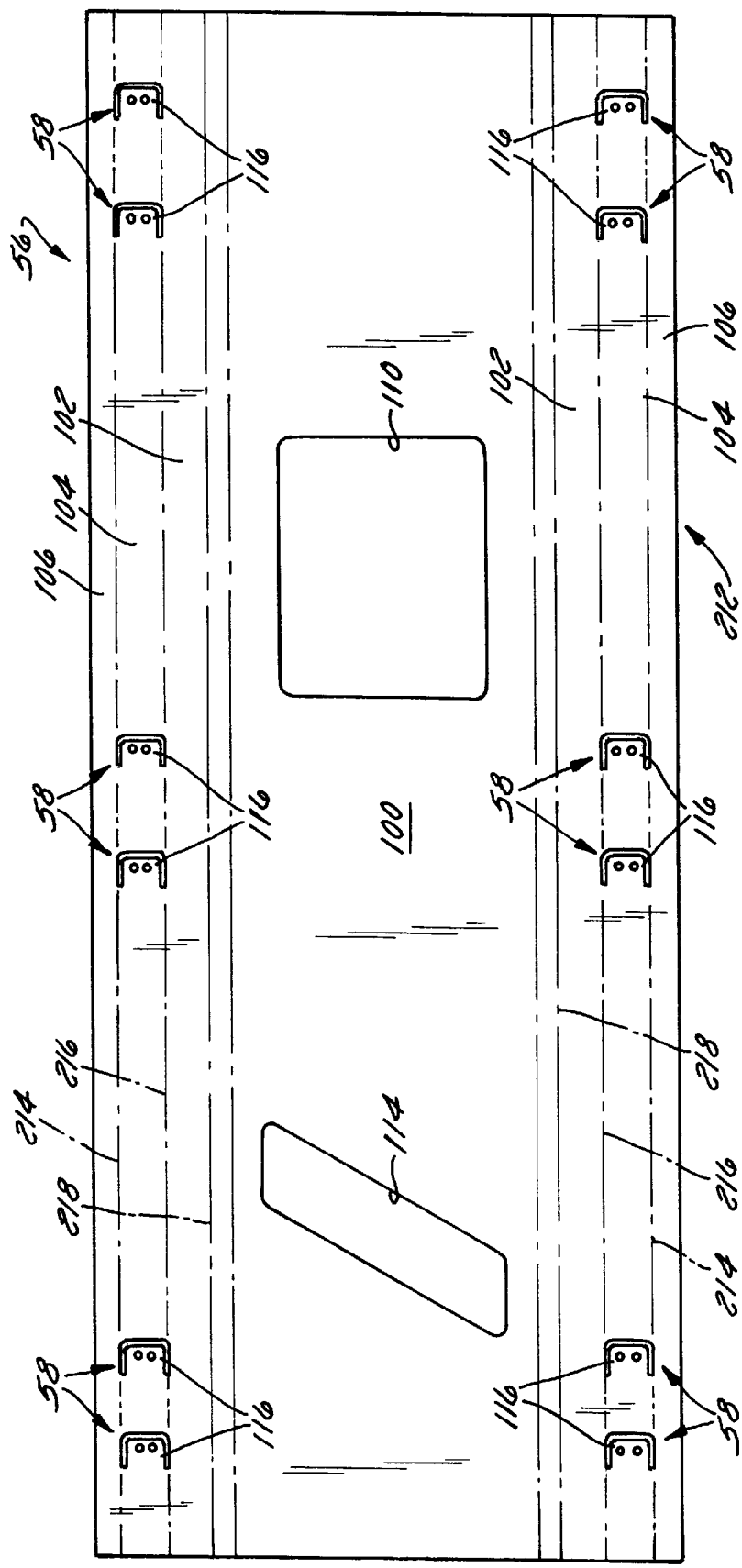
FIG. 16 is a top view of a flat conveyor pan blank sheared to size and punched to form two rows of spaced apart spring mounts, a hole for a dewatering or sorting screen, and a slot for aligning product exiting the conveyor.
Figure 17:
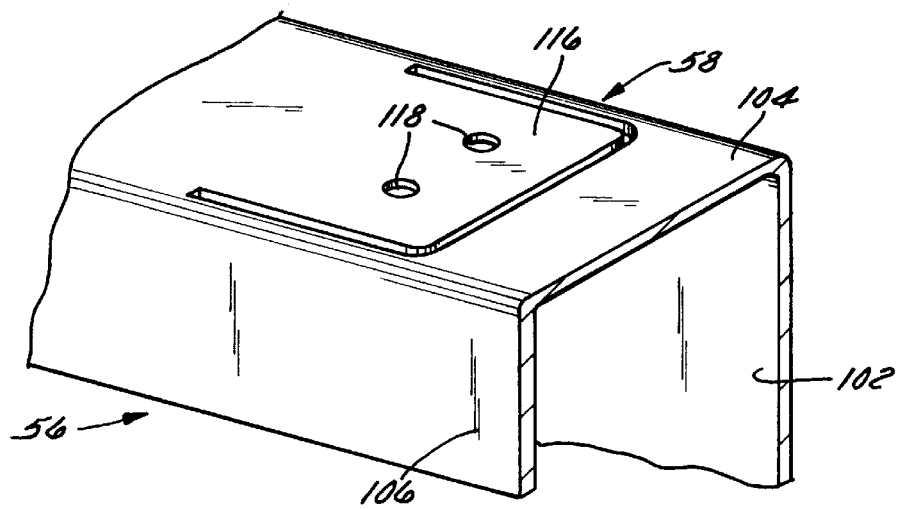
FIG. 17 is a fragmentary sectional perspective view of the pan showing the pan after forming but before bending the punched spring mounts.
Figure 18:
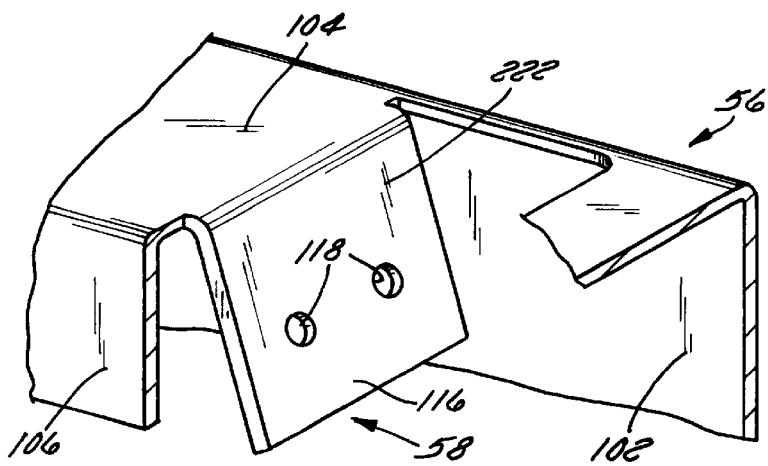
FIG. 18 is a fragmentary perspective view of the pan after bending the spring mount.
Figure 20:
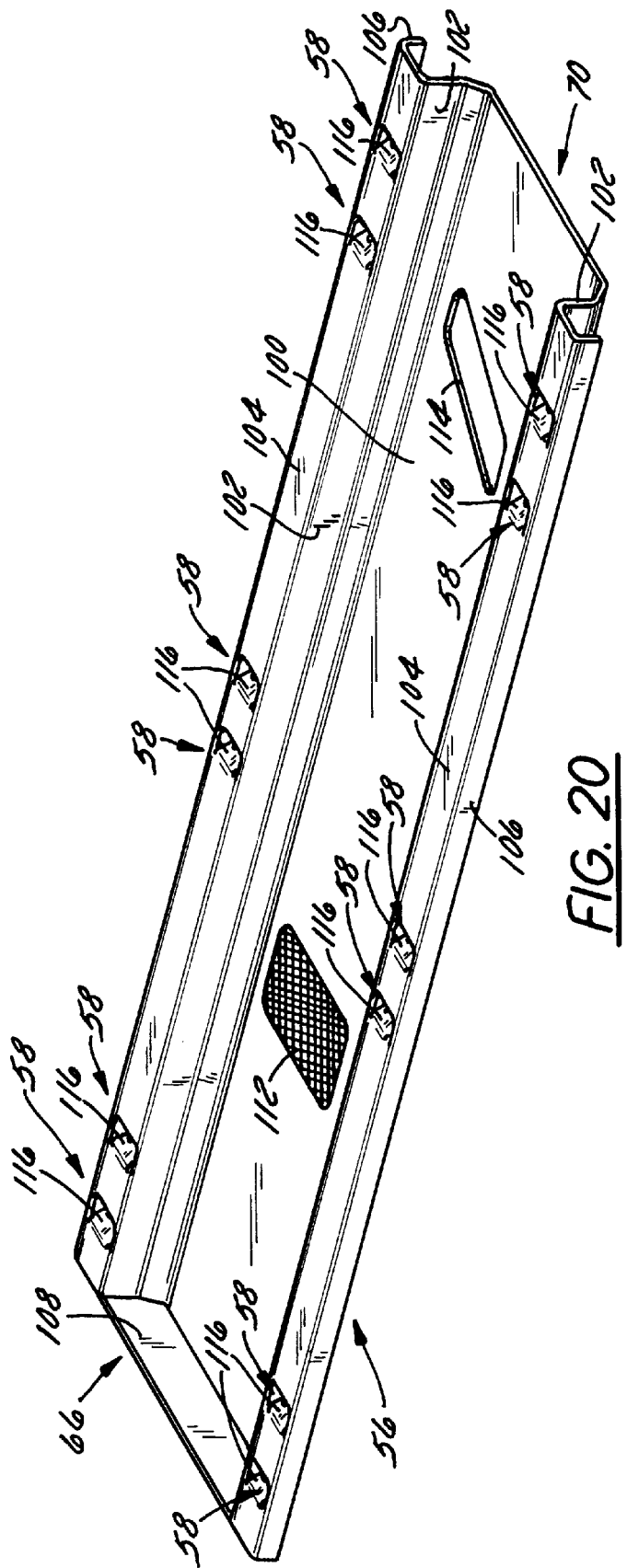
FIG. 20 is a perspective view of a finished pan.

Referring additionally to FIGS. 16 & 20, for dewatering and/or sorting applications, the pan 56 can have a hole 110 (FIG. 16) with a screen 112 (FIG. 20) overlying the hole 110 to allow water to drain through the screen 112. Where the conveyor 40 is used to move product received in pouches, the bed 100 of the pan 56 can also have an angled slot 114 adjacent the outlet 70 that helps align and drop pouches onto another conveyor, such as a conventional belt-type conveyor, in a single file and without stacking pouches on top of each other.

The pan spring locators 58 are spring mounting tabs 116 punched in the wings 104 of the pan 56 and are thereafter bent downwardly between the sidewall 102 and flange 106. The pan 56 and tabs 116 preferably are of one piece and unitary construction. Because the tabs 116 are punched and formed from the pan 56 they are accurately located relative to the pan 56 helping to ensure accurate location of the springs 54. Preferably, each tab 116 is punched and formed to accurately located relative to one end of the pan 56 within a tolerance of at least 0.005 inch and accurately located relative to a top or bottom edge of the pan 56 within a tolerance of at least 0.005 inch. To mount a spring to each tab 116, each tab 116 has a pair of spaced apart mounting holes 118.

As is shown in FIG. 1, the pan 56 floats above the conveyor frame 44 on a plurality of springs 54 which are preferably each of leaf-type, planar, or plate-type construction. Each spring 54 is angled about 20° relative to a perpendicular to the pan bed 100 so that during operation the pan 56 lifts as it is urged forward during each drive oscillation to more efficiently move product along the pan 56.

Each spring 54 preferably is constructed of fiberglass or a fiberglass laminate and is known in the industry as a scotch-ply type spring. Suitable leaf-type springs can be made of plastic, aluminum or steel. If cast aluminum "dog-bone" type springs are used, they preferably are used with fasteners isolated from the spring mounts 52 & 58 by rubber or synthetic grommets to dampen and absorb vibration.

Figure 21:
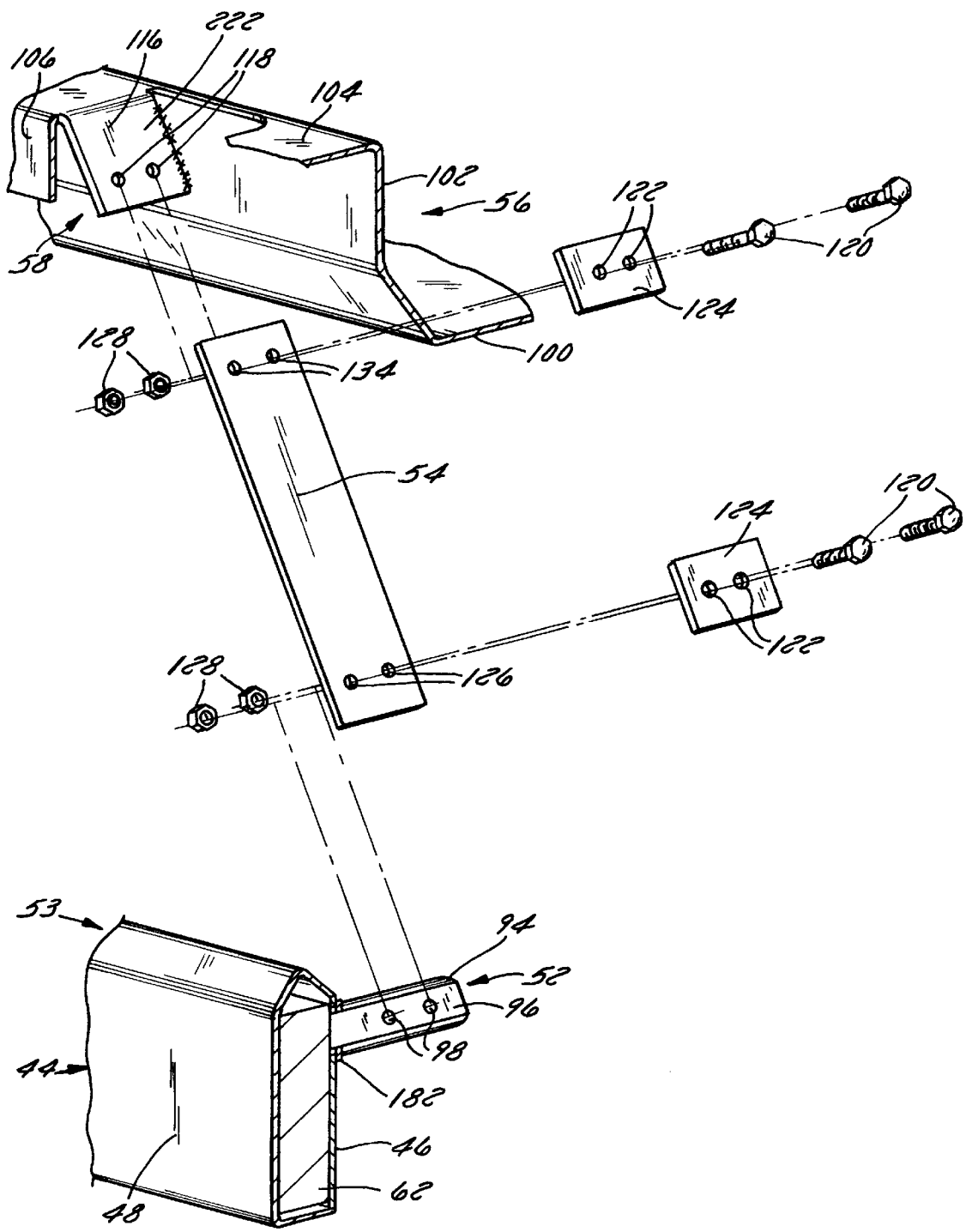
FIG. 21 is a partial fragmentary exploded view of the conveyor showing the spring mounts, spring and mounting hardware.

Referring to FIGS. 5 and 21, each spring 54 is mounted at one end to one of the spring mounting plugs 94 by a pair of fasteners 120 which extend through bores 122 in a clamp plate 124, bores 126 in the spring 54 and bores 98 in the plug 94. Each fastener 120, preferably a bolt, has a threaded end which receives a nut 128 that threadably clamps the spring 54 between the plate 124 and the flat spring mounting surface 96 of the plug 84. As is shown in FIG. 5, to prevent counterrotation of the fastener 120 and to help distribute the force of its head more evenly along the plate 124, there preferably is a washer 130 between the fastener head and the plate 124. To prevent unthreading of the nut 128, there also is a washer 132 between the nut 128 and plug 84.

Each spring 54 is mounted at its other end to one of the tabs 116 by a pair of fasteners 120 which extend through bores 122 in a clamp plate 124, bores 134 in the spring 54 and holes 118 in the planar tab 116. Each fastener 120, preferably a bolt, has a threaded end which receives a nut 128 threadably clamping the spring 54 between the plate 124 and tab 116. Preferably, there is a washer 130 between the fastener head and spring 54 and another washer 132 between the nut 128 and tab 116.

Figure 2:
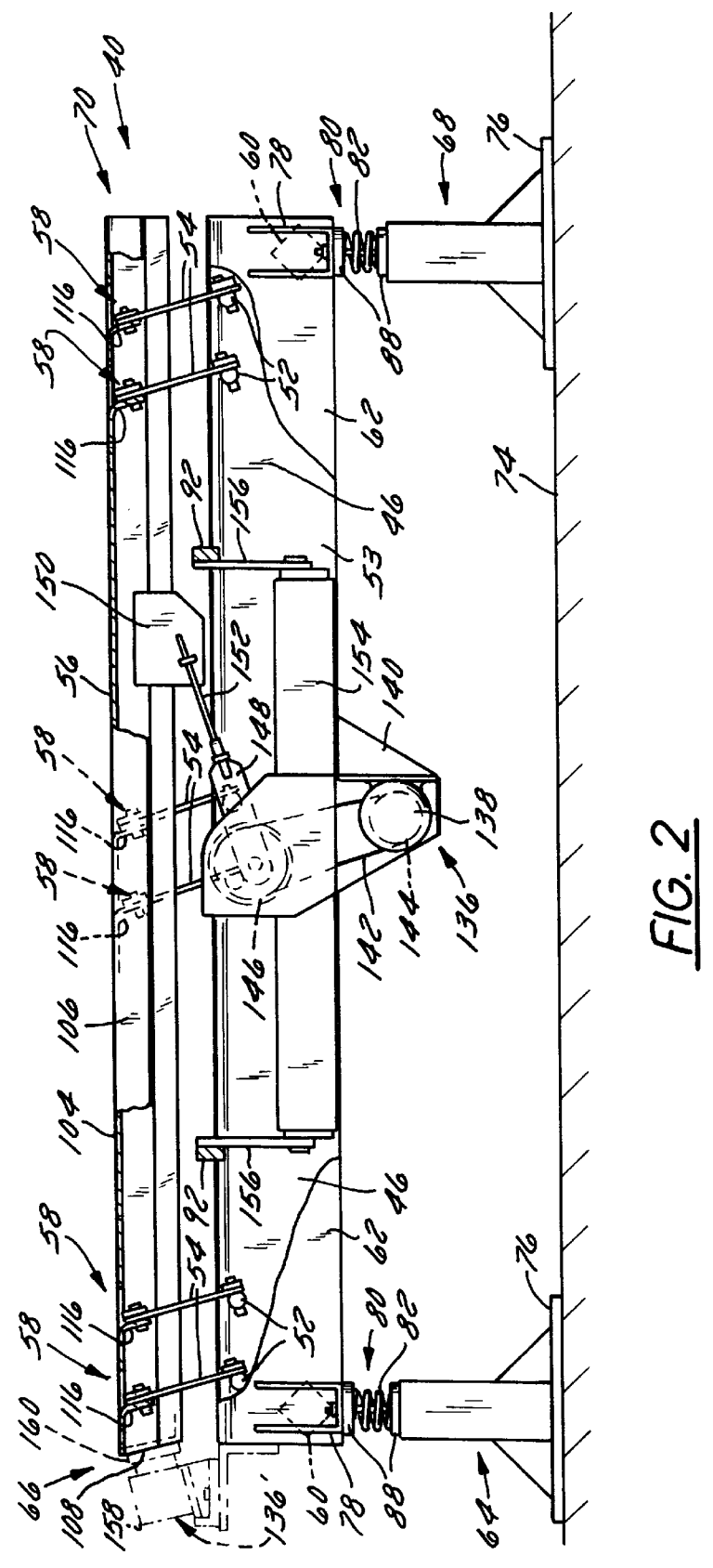

As is shown in more detail in FIG. 2, the pan is driven by an electromechanical drive 136 which oscillates the pan 56 along its longitudinal axis back and forth at a rate of about 500 to as many as about 3500 or more oscillations per minute while the frame 44 and base 42 remain stationary. These oscillations produce the pan displacement and vibration necessary to move the product being conveyed along the bed 100 of the pan 56 from the inlet end 66 of the conveyor 40 toward the outlet end 70.

The electromechanical drive 136 shown in FIGS. 1 & 2 includes an electric motor 138 carried by a mounting bracket 140 attached to at least one and preferably both of the support beams 62. An endless flexible power transmission member 142, such as a belt or chain, has one loop received on a pulley or sheave 144 (in phantom) of the motor 138 and another loop received around a sheave or pulley coupled to an eccentric bearing 146 journalled for rotation to one and preferably both of beams 62. A crank 148 eccentrically attached to the bearing 146 extends outwardly toward the pan 56 and is fixed to a bracket 150 of the pan 56 by a leaf-type spring 152 that preferably is another scotch-ply type fiberglass spring 152. To help minimize frame and base vibration to thereby help prevent the entire conveyor 40 from "walking" along the floor 74, there is a rather large and relatively heavy metal counterweight 154 hanging from leaf-type springs 156 attached to the cross braces 92. In operation of the conveyor 40, as the drive motor pulley 144 rotates, it rotates the bearing 146 displacing the crank 148 and spring 152 back and forth which, in turn, moves the pan 56 back and forth causing the pan 56 to vibrate.

In another preferred conveyor pan drive arrangement, the drive 136' can be an electromagnetic drive 136' (shown in phantom in FIGS. 1 & 2). The electromagnetic drive 136' has an electromagnet 158 adjacent the conveyor inlet 66 carried by the frame 44 to which half-wave alternating electric current is applied causing the electromagnet 158 to rapidly periodically magnetically attract a steel striker plate 160 attached to the end wall 108 of the pan 56 to oscillate the pan 56. If an electromagnetic drive 136' is used, only one support beam 62 is required, preferably with the beam 62 centrally located underneath the pan 56 and spring mounting plugs 94 extending outwardly from both sides of the beam 62, such as is depicted in FIG. 4. No counterweight preferably is needed.

Figure 6:
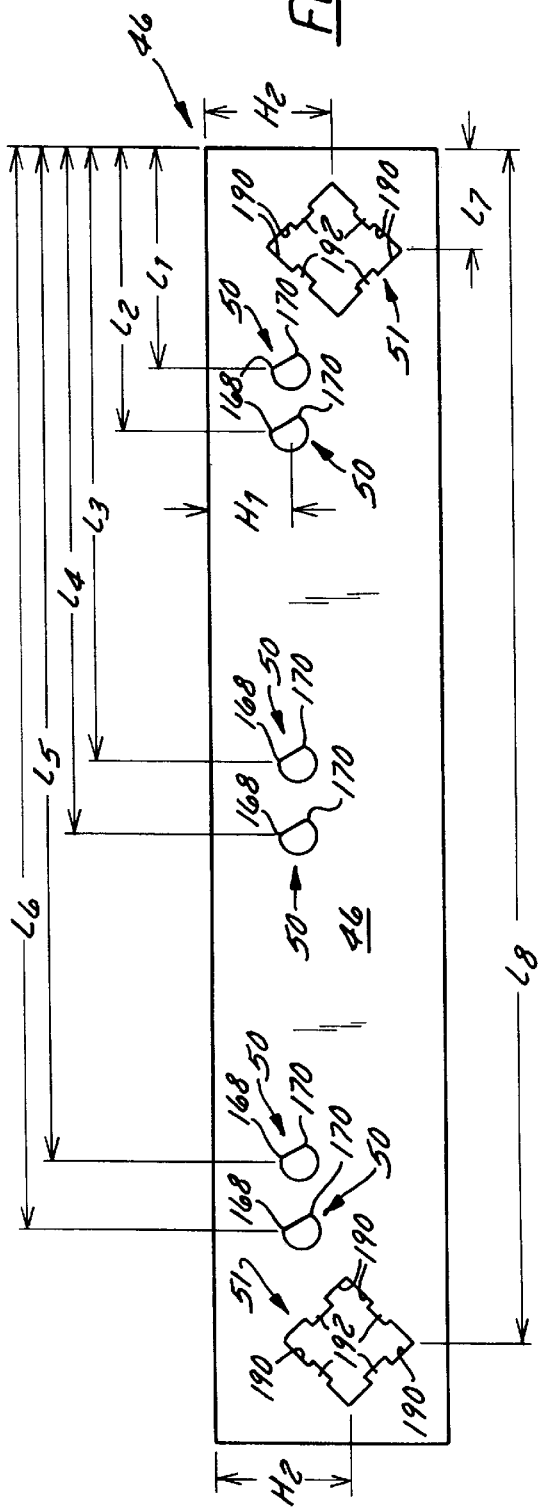
FIG. 6 depicts a blank of cladding sheared to size and punched to form a locator sheet for locating the spring mounts attached to the frame.
Figure 7:
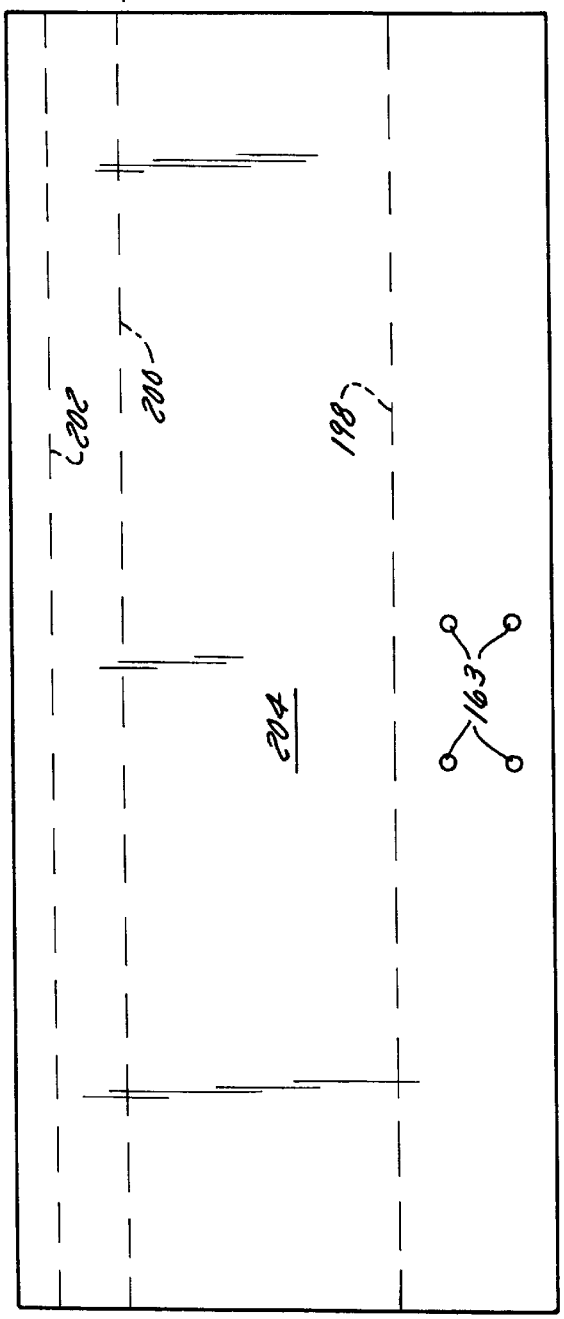
FIG. 7 depicts a blank of cladding sheared to size before bending along fold lines to form an outer cladding sheet attached to the outer surface of a support beam of the frame.
Figure 15:
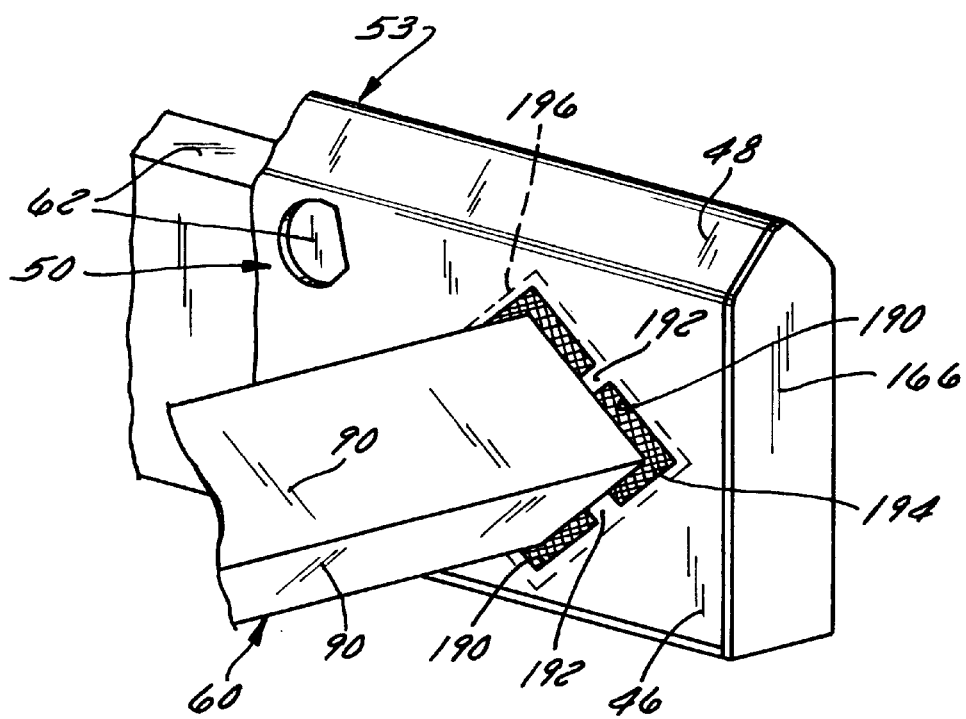
FIG. 15 is a fragmentary perspective view of the tube and beam showing the tube welded to the beam.

Referring additionally to FIGS. 6–14, the cladding sheets 46 & 48 are also locator sheets 46 & 48 preferably constructed of a corrosion resistant material that preferably is a stainless steel, about 0.125 inch thick, for enabling the underlying support beam 62 carrying the sheets 46 & 48 to be made from a less expensive, less corrosion resistant material while providing a smooth, aesthetically pleasing, easy to clean and highly corrosion resistant exterior that is particularly well suited for food processing applications. As is shown in FIG. 4, each beam 62 has an inner sheet 46 and an outer sheet 48 fixed to it with the sheets 46 & 48 preferably also fixed to each other. Each inner locator sheet 46 extends from one end of the beam 62 to the opposite end of the beam 62, has the spring mount locators 50, and therefore serves as the locator sheet for locating the spring mounts 52, namely the spring mounting plugs 94. The outer locator sheet 48 has a right-angled bottom leg 162 received under and spaced slightly from the bottom of the beam 62 and a triangularly shaped top leg 164 which overlies the top of the beam 62. As is shown in FIG. 15, after fixing the sheets 46 & 48 to the beam 62, a cap 166 of cladding material is fixed to the ends of both sheets 46 & 68. Referring to FIG. 7, the outer locator sheet 48 preferably has punched locator holes 163 for accurately locating the drive motor mounting bracket 140.

Referring to FIGS. 6 & 7, both sheets 46 & 48 are sheared from a larger flat blank of material to accurately cut the sheets 46 & 48 to the desired size. Preferably, the sheets 46 & 48 are sheared using a conventional punch and die but can preferably also be sheared using a laser such that the dimensions of each sheet 46 & 48 are within at least 0.010 inches of the actual desired dimensions. After shearing, the inner locator sheet 46 shown in FIG. 6 is punched using a die punch or another suitable punching device, that preferably can be CNC controlled, to punch several spaced apart accurately located holes used as locators 50 to locate each of the spring mounting plugs 94 and as locators 51 to locate each of the cross tubes 60 within a tolerance of no greater than 0.005 inches relative to one end of the sheet 46 and no greater than 0.005 inches relative to the top/bottom (circle one) edge of the sheet 46. Shearing and punching can also be accurately done to these tolerances using a laser.

As is shown in FIG. 6, the first spring mount locator hole 50 is located a distance, $L_1$, from the center of the hole 50 to the end of the sheet 46, the second spring mount locator hole 50 is located a distance, $L_2$, from the end of the sheet 46, and so forth. All of the spring mount locator holes 50 are shown located a distance, $H_2$, from the top edge of the sheet 46. Similarly, one of the cross tube locator holes 51 is accurately located a relatively short distance, $L_7$, from the sheet end 46, the other of the cross tube locator holes 51 is accurately located a farther distance, $L_8$, from the sheet end, and both cross tube locator holes 51 are accurately located a distance, $H_2$, from the top edge of the sheet 46. Preferably, each of these holes 50 & 51 are accurately located within 0.005 inches.

Figure 10:
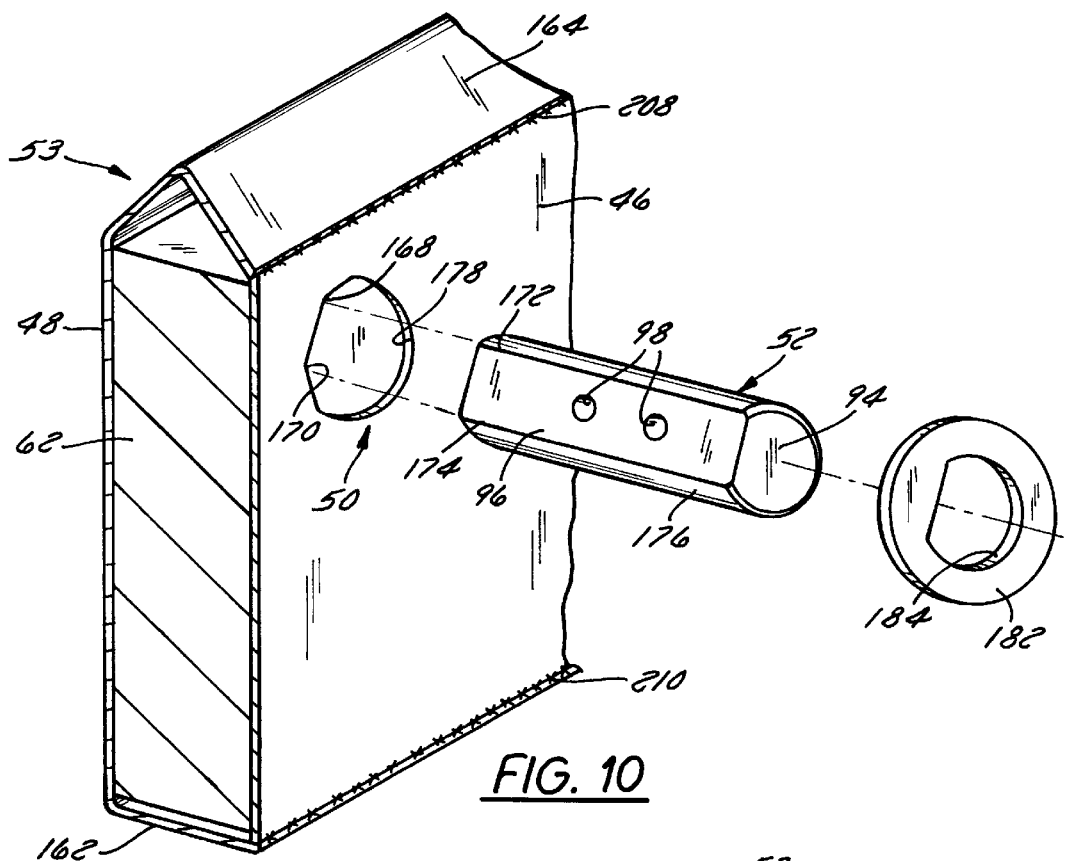
FIG. 10 is a fragmentary perspective sectional view showing the spring mount and washer exploded from the beam.
Figure 11:
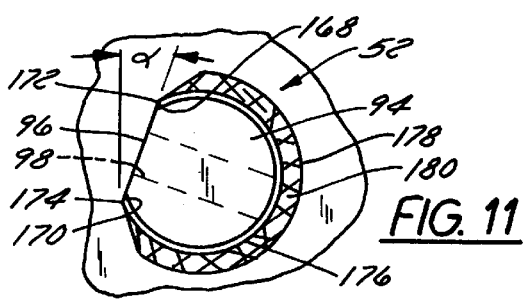
FIG. 11 is an end view of the spring mount depicting a weld joining the mount to the beam.
Figure 12:
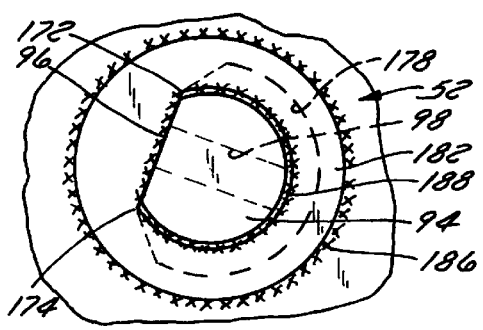
FIG. 12 is an end view of the spring mount after the washer has been slipped over the mount illustrating a weld joining the washer to the locator sheet and another weld joining the washer to the mount.
Figure 13:
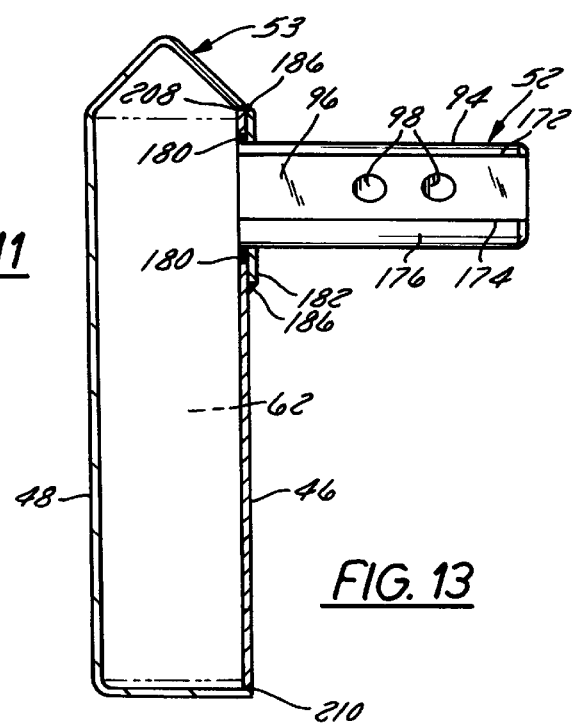
FIG. 13 is a cross sectional view of the cladding sheets showing the spring mount cantilevered outwardly after welding.

As is shown more clearly in FIGS. 10 & 11, each spring mount locator hole 50 has a pair of spaced apart locator notches 168 & 170 that receive the corners 172 & 174 of a plug 94 formed where the spring mounting surface 96 and rounded exterior 176 of the plug 94 converge. When both corners 172 & 174 of a plug 94 are brought to bear against the locator notches 168 & 170 of a locator hole 50, the plug 94 is accurately located preferably within 0.005 inches relative to the upper or lower edge of the locator sheet 46 and preferably within 0.005 inches relative to one end of the sheet 46. Preferably, the locator notches 168 & 170 of each locator hole 50 are arranged to orient the flat spring mounting surface 96 of the plug 94 at an angle, α, of about 20° relative to the perpendicular of the locator sheet 46 so that all of the mounting surfaces 96 of all of the plugs 94 will be at the same angle so that each spring 54 will bend about an equal amount during each pan oscillation during conveyor operation. By helping to ensure the springs 54 bend substantially an equal amount, it prevents any spring 54 from bending a significantly greater amount than any other spring 54 thereby minimizing the amount of stress placed on each spring 54 during operation thereby helping each spring 54 to last longer. Additionally, by each of the springs 54 bending substantially an equal amount, the force of the springs 54 resisting pan movement and returning the pan 56 are more equal along both sides of the pan 56 resulting in a conveyor 40 that operates more smoothly.

As is depicted in FIG. 11, each locator hole 50 has a rounded portion 178 of a radius greater than the radius of the rounded plug portion 176 for exposing a portion of the underlying beam 62 to enable the plug 94 to be fixed directly to the beam 62 by a weld 180 cantilevering the plug 94 from the beam 62. The weld 180 preferably extends about the periphery of the plug 94 and preferably also helps to fix the sheet 46 to the beam 62. A washer 182 constructed of a corrosion resistant material, that preferably is stainless steel, has an opening 184 of a shape complementary to the cross sectional shape of the plug 94, is slid over the plug 94 after the plug 94 has been welded to the beam 62, and secured to the locator sheet 46 by a weld 186 about the periphery of the washer 182 and to the plug 94 by another weld 188 about the periphery of the plug 94 thereby sealing and protecting the underlying plug weld 180 and beam 62.

Each cross tube locator hole 51 has four edges 190 arranged in a rectangular or square shape with a locator finger 192 extending inwardly from each edge 190 that bears against the exterior of one of the sidewalls 90 of the tube 60 to locate the tube 60 within the hole 51 thereby accurately locating the tube 60 relative to one edge and the end of the locator sheet 46. The square or rectangle defined by the edges 190 of the hole 51 is spaced from the sidewalls 90 of the tube 60 for exposing a portion of the underlying beam 62 to enable the tube 60 to be fixed by a weld 194 directly to the beam 62. Although shown in phantom in FIG. 15, a corrosion resistant washer 196 can be slipped over the tube 60, urged against the sheet 46, and fixed to the sheet 46 by welding it about the outer periphery of the washer 196 and about the periphery of the tube 60.

The outer locator sheet 48 is shown in FIG. 7 as a blank 204 in its flat and sheared condition. Prior to bending, the blank 204 is punched to form the locator holes 163 for the drive motor mounting bracket 140. The blank 204 is then bent along the dashed bend lines 198, 200 & 202, preferably using a brake press or another kind of metal bending machine, to form it into the cross sectional shape shown in FIG. 8. To form the bottom leg 162 of the sheet 48, a lower portion of the blank 204 is bent along bend line 198 slightly more than 90° so that after springback, the lower portion will be bent about 90°. To form the triangularly shaped top leg 164, the extreme upper portion of the blank 204 is first bent along bend line 202 slightly more than 90° to accommodate springback. Thereafter, a portion of the blank 204 below the extreme upper portion is bent along bend line 200 slightly more than 45° so that it is bent about 45° after springback forming it into the sheet 48 shown in FIG. 8. Referring to FIG. 9, after forming, notches 206 are cut in each top leg 164 of the sheet 48 to accommodate one end of one of the cross braces 92 so that each cross brace 92 can be welded to each beam 62.

Referring to FIG. 4, after shearing, punching and forming, the sheets 46 & 48 are fixed to the beam 62 by an upper weld 208 along the top edges of the sheets 46 & 48 and by a lower weld 210 along the bottom edges. Before welding, the outer sheet 48 is placed against the beam 62 such that (a) its bottom corner receives the bottom corner of the beam 62 to help transversely locate the sheet 48 relative to the beam 62 and (b) one end of the sheet 48 is flush with the end of the beam 62 to help longitudinally locate the sheet 48 relative to the beam 62. When placed against the beam 62, the sheet 48 has its bottom leg 162 slightly spaced apart from and underlying the bottom of the beam 62 with a portion of the bottom leg 162 extending outwardly beyond the beam forming a ledge for helping to transversely locate the inner sheet 46 relative to the outer sheet 48 and beam 62. The end of the inner sheet 46 is flush with the end of the beam 62 and flush with the end of the outer sheet 48 to longitudinally locate the inner sheet 46 relative to one end of the beam 62.

Preferably, the outer sheet 48 is first located relative to the beam 62 and at least tacked to the beam 62 to hold its location, the inner sheet 46 is thereafter located relative to the beam 62 and outer sheet 48, and both sheets 46 & 48 are welded along their bottom edge to each other and the beam 62. Thereafter, the sheets 46 & 48 preferably are welded to each other along their upper edges preferably also welding the sheets 46 & 48, at least along some portions of both sheets 46 & 48, to the beam 62. Where welding is performed to weld stainless steel sheets 46 & 48 to a mild steel beam 62, welding rod or welding electrode known in the trade as missile rod, is used.

Construction of the conveyor pan 56 is depicted in FIGS. 16–20. The pan 56 is formed of a blank 212 of corrosion resistant material that preferably is stainless steel that is sheared to size from a larger piece of material to produce the flat blank 212 shown in FIG. 16. The blank 212 is then punched to advantageously simultaneously form slots defining the spring mounting tabs 116, the dewatering screen window 110, and a pouch alignment slot 114. Preferably, the spring mounting holes 118 in each tab 116 are also formed during punching. Preferably, the punching process used to punch the tabs 116, holes 110 & 118 and slot 114 is a die punching process. If desired, the slots defining the tabs 116 can be laser cut or the spring mounting holes 118 can be drilled.

During forming, the pan blank 212 is formed by bending the blank along the dashed fold lines 214, 216 & 218 shown in FIG. 16 resulting in the three dimensionally contoured pan shown in FIG. 20 having spaced apart sidewalls 102, outwardly extending wings 104, and downturned flanges 106. Preferably, bending is done using a press brake but can be done using another forming process. While each tab 116 can be bent downwardly during forming of the sidewalls 102, wings 104 and flanges 106, the tab 116 preferably is bent downwardly during a separate forming step that preferably is after the sidewalls 102, wings 104, and flanges 106 have been formed. Preferably, forming of each tab 116 is done using a die press where the die (not shown) has guide pins (not shown) extending outwardly from one portion of the die on one side of the tab 116 which are each received through a mounting bore 118 of the tab 116 for engaging another portion of the die on the other side of the tab 116 to align the die portions to help ensure an accurate tab bend.

Figure 19:
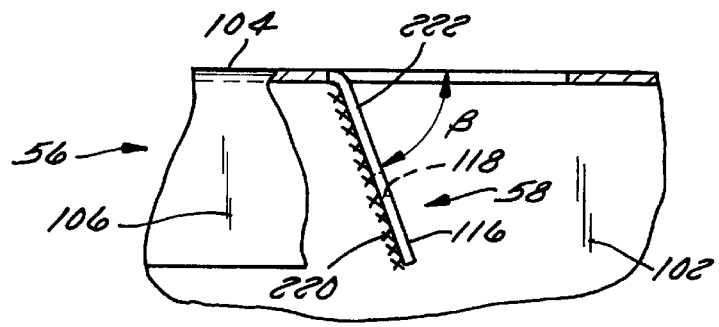
FIG. 19 is a fragmentary sectional view of the pan and spring mount showing the angle of bend of the spring mount and the mount welded along one side to the pan.

Referring to FIG. 19, during forming each tab 116, each tab 116 is bent downwardly between an adjacent sidewall 102 and flange 106 such that after bending the tab 116 is disposed at an angle, β, of about 70°. Referring to FIG. 19, each tab 116 is thereafter fixed to the adjacent sidewall 102 by a weld 220 and to adjacent flange 106 by another weld (not shown) locking in place its angular position and creating a rigid tab 116 capable of withstanding rather large forces without failing and cycling without fatiguing.

By punching all the tabs 116 from the blank 212 that is to be formed into the conveyor pan 56, the tabs 116 are accurately located relative to at least one end of the pan 56 as well as from either or both edges of the pan 56 helping to ensure that the tabs 116 will be accurately located relative to the pan 56 and relative to each other. By this method of making the tabs 116 during the punching operation, a significant amount of time and labor is saved because no manual location and manual attachment of each tab 116 is required.

Prior to welding, if desired, one or more of the tabs 116 can be manually "fine tuned" by being slightly bent or twisted to help ensure that the flat spring mounting surface 222 of the tab 116 defines a plane that is substantially parallel to a plane defining the spring mounting surface 96 of the plug 94 when connected to the tab 116 by a spring 54, such as is depicted by FIG. 5. This further helps to minimize spring failure by ensuring that the top portion of the spring 54 is substantially parallel to its bottom portion at all times thereby preventing any twisting of the spring 54 during operation. Preferably, to make a fine adjustment to the position of one or more of the tabs 116, the springs 54 are attached to the spring mounting plugs 94 and the pan 56 is placed over the frame 44 with the tabs 116 in alignment with the upwardly extending springs 54. All of the tabs 116 are attached to the springs 54 and a measurement device (not shown), such as a plane or the like, measures the amount of bend and twist in each tab 116 while the pan 56 is unloaded and not being oscillated. Thereafter, those tabs 116 which appear to need slight adjust are bent or twisted as needed until the spring 54 has no apparent bend or twist while the pan 56 is in the unloaded condition. Those tabs 116 which need to be adjusted are preferably expediently done while attached to a spring 54 but can also be done by completely disengaging the pan 56 from the springs 54, bending and/or twisting and reattaching to the springs 54 to recheck the position of the tabs 116. After fine tuning the tabs 116, each tab 116 is welded to the pan 56 to lock its position and location. Preferably, however, fine tuning is not needed and each tab 116 is welded to the pan 56 after forming the pan 56 but before the pan 56 is assembled to the frame 44.

Referring to FIG. 21, in assembling the pan 56 to the frame 44, the springs 54 are first attached to the spring mounting plugs 94. In attaching each spring 54 to a plug 94, the spring 54 is placed against the mounting surface 96 of the plug 94 with its bores 126 generally aligned with the bores 98 in the plug 94. The clamp plate 124 is placed against the spring 54 with its bores 122 generally aligned with the bores 125 in the spring 54 and plug 94. Thereafter, a fastener 120 carrying a washer 130 is slidably telescopically urged through each of the bores 98, 122 & 126 until its threaded end extends outwardly beyond the plug 94 and its head bears against the plate 124. Another washer 132 is slipped over the threaded end of the fastener 120 and a nut 128 is threaded onto the fastener 120 and tightened, preferably using tools, until the spring 54 is firmly clamped between the plug 94 and plate 124.

With the springs 54 attached to the plugs 94, the pan 56 is positioned over the springs 54 with its tabs 116 generally aligned with the springs 54 such that the free end of each spring 54 bears against the spring mounting surface 222 of one of the tabs 116 with both of the bores 134 of the spring 54 aligned with the mounting holes 118 of the tab 116 it is against. A clamping plate 124 is placed against the spring 54 such that its bores 122 align with the bores 134 in the spring 54 and the mounting holes 118 in the tab 116. Thereafter, a fastener 120 carrying a washer 130 is slidably telescopically urged through each set of bores 122, 134 & 118 until its threaded end extends outwardly beyond the tab 116. A washer 132 is placed over the threaded end along with a nut 128 that is tightened to tightly clamp the spring 54 between the tab 116 and plate 124.

Figure 22:
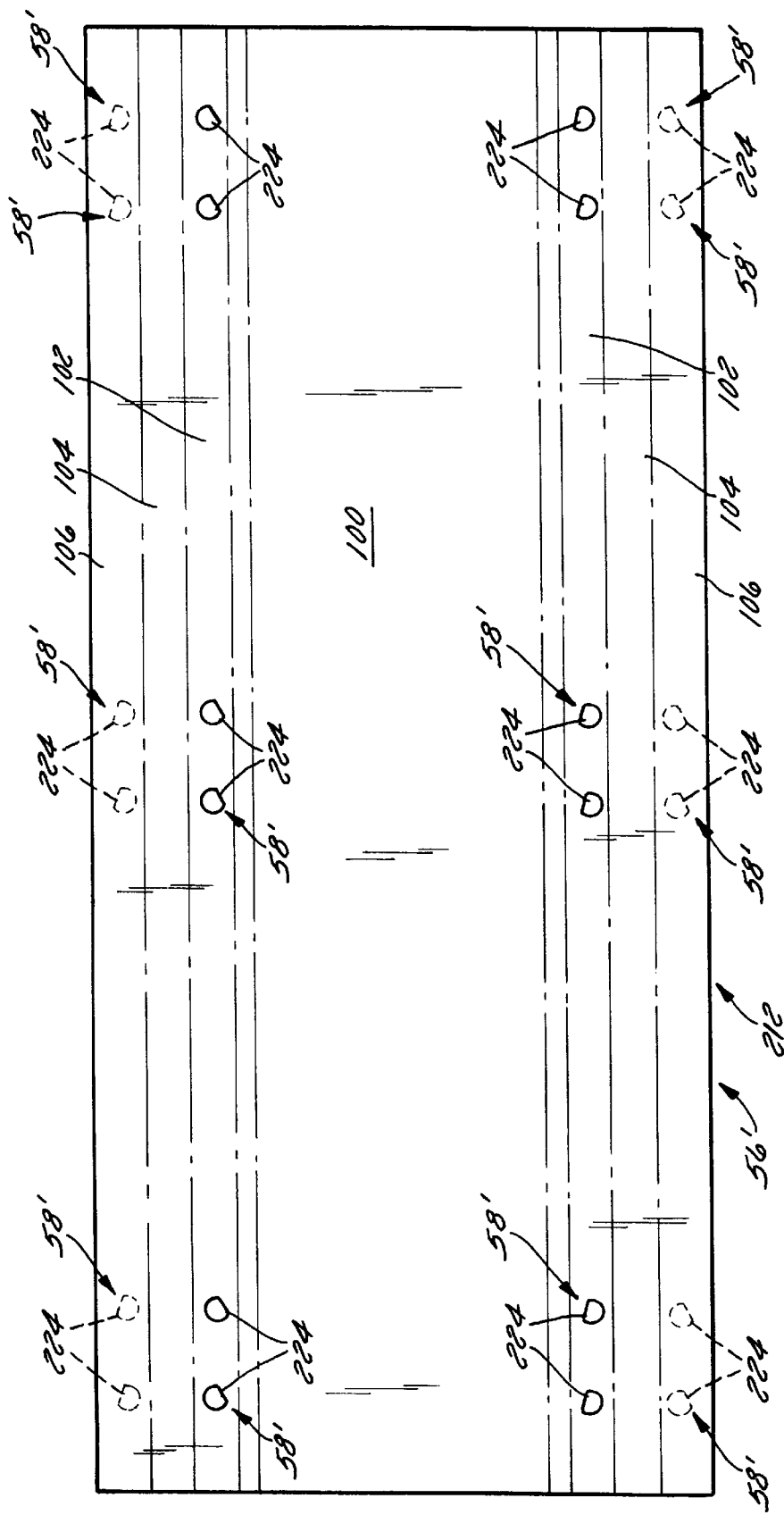
FIG. 22 is a top view of a pan blank of a second preferred embodiment after shearing and punching.
Figure 23:
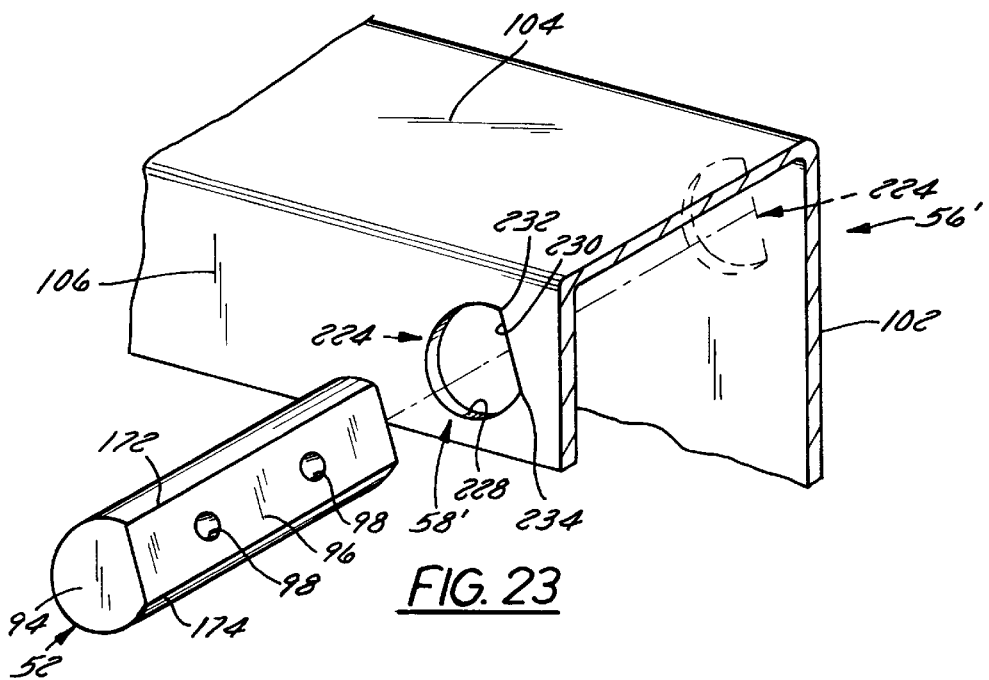
FIG. 23 is an exploded perspective view of a portion of the pan depicting assembly of spring mounting plug type spring mounts.
Figure 24:
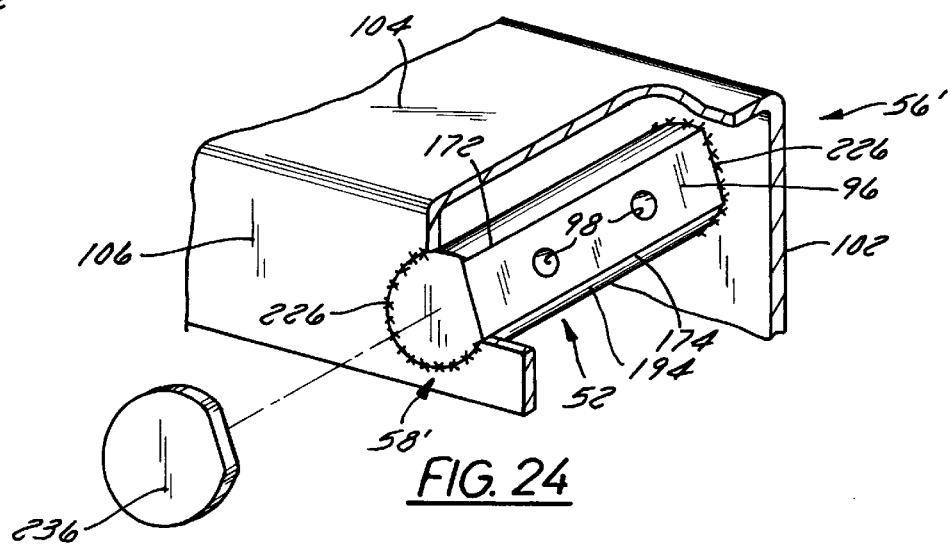
FIG. 24 is a fragmentary perspective view of a portion of the pan depicting the plug received by the locators and welded at both ends to the pan.
Figure 25:
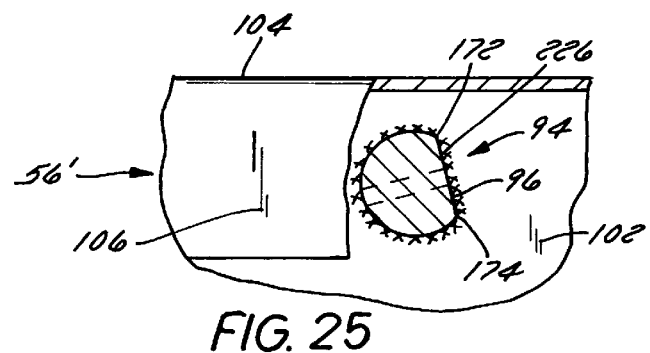
FIG. 25 is a sectional side view of the plug showing the angle of inclination of its spring mounting surface.

FIGS. 22–25 illustrate another preferred method of making the pan 56' also is having preformed unitary spring mount locators 58'. As is shown in FIG. 22, the pan 56' is sheared to size and then punched to form a plurality of preformed spring mount locators 58' that can comprise outwardly bulging dimples 224 each having a shape complementary to the end of the spring mount 52. After forming of the pan, each dimple 224 in the downturned flange 106 faces and is generally aligned with a dimple 224 in the adjacent pan sidewall 102. In assembly, as is depicted in FIG. 23, the spring mount 52, preferably in the shape of a plug 94, is brought toward a pair of aligned dimples 224 from underneath a wing 104 until it is received between the dimples 224 locating the plug 94 relative to one end of the pan 56' and one edge of the pan 56'. The complementary dimple shape also helps angularly locate the spring mounting surface 96 of the plug 94 so it is in the proper position to receive a spring 54. As is shown in FIG. 25, each pair of facing locator dimples 224 angularly orients the plug 94 such that its flat spring mounting surface 96 is disposed at about a 20° angle relative to the exterior surface of the wing 104.

To help hold the plug between the dimples 224, the plug 94 can be constructed so as to be slightly longer than the distance between the inner surfaces of the sidewall 102 and flange 106 for providing at least a slight friction fit between the plug 94, sidewall 102 and flange 106. After being positioned between the dimples 224, the plug 94 is welded adjacent one end to the sidewall 102 and the other end to the flange 106. Where dimples 224 are used, the pan 56' can be spot welded to the sidewall 102 and flange 106 at the dimples 224. Preferably, the plug 94 is welded to the pan 56' using a consumable electrode or wire such that the resultant weld 226 extends around the periphery of each plug end.

Although each spring mount locator 58' can be a dimple 224, each spring mount locator 58' preferably comprises a hole 224 in the pan blank produced during the punching operation. Each hole 224 has a shape complementary to the cross section of the spring mount 52, which preferably is a plug 94. As is shown in FIG. 22, if desired, the pan 56' can be constructed such that after forming, each locator 58' of the pan 56' can comprise a locator hole 224 in both the sidewall 102 and flange 106. Preferably, only one hole 224, in either the sidewall 102 or flange 106, is required for each spring mount 52 with one end of the mount 52 abutting against and welded to the other of the sidewall 102 or flange 106.

Referring to FIG. 23, where two locator holes 224 for each mount 52 are used, after forming is completed, each locator hole 224 in the sidewall 102 is relatively accurately aligned with an adjacent locator hole 224 in the flange 106 for enabling a mount 52 of complementary shape to be telescopically slidably inserted through both holes 224, such as is depicted in FIGS. 23 & 24. Where the mount 52 is a plug 94, each locator hole 224 has a curved portion 228 and a straight portion 230 with locator notches 232 & 234 accurately locating the plug 94 relative to the pan 56' while also accurately angularly locating its mounting surface 96.

After being received in both holes 224 such that the plug 94 is cradled by the holes 224, the plug 94 is fixed at each end to the pan 56' by a weld 226 joining one end of the plug 94 to the sidewall 102 and another weld 226 joining the other end of the plug 94 to the flange 106. If desired, each hole 224 and weld 226 can be covered by a patch 236, preferably constructed of a corrosion resistant material, that is placed over each hole 224 and welded around the periphery of the patch 236 to the pan 56'.

In the assembly of the conveyor 40 of this invention, each support beam 62 is cut to length such that at least one of its ends preferably is square relative to its sides. The inner and outer sheets 46 & 48 of cladding 53 are sheared from blanks to cut them to the desired size. Thereafter, the inner locator sheet 46 is punched to form locator holes 50 for the plugs 94 and locator holes 51 for the cross tubes 60. The outer locator sheet 48 is punched to form the motor bracket mounting locator holes 163 and is thereafter three dimensionally formed such that it conforms to the cross sectional shape shown in FIG. 8.

Both the inner and outer sheets 46 & 48 are welded to the beam 62 and to each other. Thereafter, each cross tube 60 is inserted into its locator hole 51 of each inner locator sheet 48 of each beam 62 and welded at least at each corner to the beam 62 such that each cross tube 60 joins the beams 62 together. The end of each cross brace 92 is placed in the notch 206 in the outer sheet 48 of each beam 62 and welded to each beam 62 joining the beams 62 together to form the conveyor frame 44.

For each beam 62, the end of each spring mounting plug 94 is manually inserted into a locator hole 50 of the locator sheet 46 with its corners 172 & 174 received in the locator notches 168 & 170 of the hole 50. Preferably, each plug 94 is fixtured while being welded to a beam 62. After each plug 94 has been welded, a washer 182 is slipped over the plug 94, urged against the locator sheet 46 and welded about its inner periphery to the plug 94 and about its outer periphery to the sheet 46.

The pan 56 is sheared from a blank 212 to size and thereafter punched to form the spring mount locators 58. Thereafter, the blank 212 is formed into a three dimensionally contoured pan 56 having a recessed bed 100 bordered by sidewalls 102, wings 104 and flanges 106. Where tabs 116 are used to locate and mount the springs 54, they are preferably separately formed by bending them downwardly between a sidewall 102 and flange 106. To lock each downwardly bent tab 116 in position, each tab 116 is welded along one side to one of the flanges 106 and along the other side to one of the sidewalls 102.

After the frame 44 and pan 56 are constructed, the frame 44 is attached to the base portions 64 & 68 such that it is supported on the floor 74 by the base portions 64 & 68. A spring 54 is attached to each plug 94 and the pan 56 is lifted over the upwardly extending free ends of the springs 54 and maneuvered until each of its spring mounts 94 or 116 are adjacent one of the springs 54. Thereafter, each spring 54 is attached to one of the mounts 94 or 116 substantially completing the assembly. With the drive 136 mounted to the frame 44 and operably connected to the pan 56, the conveyor 40 is ready for operation.

In use, the conveyor 40 of this invention can be used to convey particulate matter, such as grain, sand, rocks, and small parts. The conveyor 40 is particularly well suited for conveying food product such as preferably rice, grain and pasta, as well as food product contained in pouches, such as soups, sauces, pasta, vegetables, juices, fruits, meats, salad dressings, condiments, as well as other types of food products such as poultry and seafood.

In use, the locator sheeting and method of this invention are well suited for use in making vibratory conveyors having a frame 44 constructed as shown in FIG. 1 comprising a pair of spaced apart and parallel support beams 62 clad in locator sheeting 46 & 48. In addition, the locator sheeting and method of this invention are also well suited for use in making vibratory conveyors having a single support beam 62 clad on both sides with a spring mount locator sheet, such as locator sheet 46, for enabling spring mounts 52 to extend outwardly from both sides of the beam 62 in the manner depicted by FIG. 4.

Although not shown in the drawings figures, the locator sheeting and method of making a vibratory conveyor of this invention are also well suited for use in making a Z-frame vibratory conveyor having a Z-shaped frame comprised of two pairs of spaced apart Z-shaped support beams carrying springs 54 supporting a horizontal conveyor pan 56 in the same manner as the conveyor 40 shown in FIG. 1 with each Z-shaped support beam constructed of a pair of parallel horizontal beam portions joined by an angled beam portion with one of the parallel horizontal beam portions disposed higher than the pan and the other of the parallel horizontal beam portions. Where the frame is Z-shaped, each parallel horizontal support beam portion has an inner locator sheet 46 with holes accurately punched for locating spring mounts 52 that are preferably plugs 94. The conveyor can also have outer locator sheets punched with locator holes for mounting the conveyor drive. The pan 56 is supported on springs 54 attached to spring mounts 52 of each lower horizontal beam portion and suspended from springs 54 attached to mounts 52 of each upper horizontal beam portion.

In operation, the drive 136 of the conveyor 40 oscillates the pan 56 back and forth relative to the frame 44 bending the springs 54 forwardly as the pan 56 moves forwardly and rearwardly as the pan 56 returns. As a result of the rapid pan 56 oscillations, product introduced adjacent the inlet end 66 travels toward the conveyor outlet 70. As a result of the springs 54 all being accurately located because their spring mounts 52 & 58 are accurately located and as a result of the conveyor drive 136 being accurately located, operation of the conveyor 40 is smooth and without exciting of any portion of the conveyor 40 into resonance. Additionally, because each spring 54 is accurately located relative to the same end of the conveyor, along a common horizontal planes, aligned in two accurately located rows and angularly located, all within a tolerance of at least 0.010 inches and preferably about 0.0005 inches, spring and spring mount fatigue and failure are minimized and preferably substantially prevented. When the product reaches the outlet 70, it falls downwardly preferably into a bin, onto another conveyor or the like for further processing, storage or transport.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A vibratory conveyor comprising:
   (a) a frame;
   (b) a locator sheet carried by and precisely positioned relative to the frame;
   (c) a plurality of precisely positioned and spaced apart spring mount locators formed in the locator sheet;
   (d) a plurality of spring mounts fixed to the frame with each spring mount corresponding to and being precisely located relative to the frame by one of the locators;
   (e) a pan; and
   (f) a plurality of springs with each spring mounted at one end to one of the spring mounts and at its other end to the pan.

2. The conveyor of claim 1 wherein the frame comprises an elongate generally horizontal beam having an end and top and bottom edges, the locator sheet has an end and top and bottom edges, and the locator sheet is fixed to the beam with its end flush with the end of the beam and one of its edges aligned with one of the edges of the beam for locating the sheet relative to the beam.

3. The conveyor of claim 2 further comprising a first weld along the top edge of the locator sheet fixing the sheet to the beam and a second weld along the bottom edge of the locator sheet fixing the sheet to the beam.

4. The conveyor of claim 2 wherein the beam is comprised of mild steel and the locator sheet is comprised of a corrosion resistant material.

5. The conveyor of claim 1 further comprising a drive secured to a mounting bracket attached to the frame with the drive operably connected to the pan for oscillating the pan back and forth relative to the frame wherein the locator sheet further comprises a plurality of drive mount locators for locating the mounting bracket relative to the frame.

6. The conveyor of claim 2 wherein each spring mount locator comprises a hole in the locator sheet accurately located within at least 0.010 inches relative to one end and one edge of the locator sheet.

7. The conveyor of claim 1 wherein each spring mount has an end fixed to the frame and each spring mount locator comprises a hole in the locator sheet with the hole having a shape complementary to the end of the spring mount for receiving the end of the spring mount and locating the spring mount relative to the locator sheet.

8. The conveyor of claim 7 wherein the end of each spring mount has at least one locator corner and each spring mount locator hole has at least one locator notch for receiving the locator corner to locate the spring mount angularly and relative to the locator sheet.

9. The conveyor of claim 7 wherein 1) each spring mount comprises a generally cylindrical plug having a rounded exterior, a flat spring mounting surface defining a generally D-shaped spring mount cross section, and a pair of locator corners where the rounded exterior and flat spring mounting surface converge, 2) each spring mount locator hole comprises a straight portion, a rounded portion and a pair of locator notches defined where the rounded and straight portions of the locator hole converge, and 3) each locator notch receives one of the locator corners of one of the spring mounts for accurately locating the spring mount angularly and relative to the locator sheet.

10. The conveyor of claim 7 wherein a portion of each spring mount locator hole is larger than the end of each spring mount for exposing a portion of the frame and further comprising a weld fixing each spring mount to the frame.

11. The conveyor of claim 10 further comprising 1) a washer comprised of a corrosion resistant material having a through-hole of a shape complementary to the cross section of each spring mount received over the spring mount and bearing against the locator sheet, 2) a weld fixing the washer to the locator sheet, and 3) a weld fixing the washer to the spring mount.

12. The conveyor of claim 1 wherein the frame comprises a pair of spaced apart and parallel support beams each having an interior surface, an exterior surface, a free end, and top and bottom sides, with the beams parallel to each other having their interior surfaces facing each other and each beam having its end flush to the end of the other beam, and further comprising a pair of the locator sheets for locating spring mounts with one of the locator sheets fixed to the interior surface of one beam and the other of the locator sheets fixed to the interior surface of the other beam, with each locator sheet having a plurality of locator holes for each receiving and locating one of the spring mounts therein.

13. The conveyor of claim 12 wherein each of the locator sheets further comprises a pair of spaced apart cross tube locators, and further comprising a pair of spaced apart cross tubes extending from one of the beams to the other of the beams with an end of each cross tube cooperating with one of the cross tube locators.

14. The conveyor of claim 13 wherein each cross tube is of rectangular cross section having four exterior walls and each cross tube locator is a hole of rectangular shape defined by four edges which each extend outwardly of one of the walls of one of the cross tubes received in the cross tube locator hole for exposing a portion of one of the support beams wherein each edge has an inwardly extending locator finger that bears against one of the walls of the cross tube to locate the tube relative to the sheet and further comprising a weld fixing the cross tube to the support beam.

15. The conveyor of claim 12 further comprising a drive carried by a mounting bracket attached to both of the beams and a pair of outer locator sheets each fixed to one of the beams with each outer locator sheet having a leg underlying the bottom of the beam and a plurality of locator holes for locating the mounting bracket and drive relative to both beams.

16. The conveyor of claim 1 wherein the pan further comprises a plurality of spaced apart spring mount locators and the pan and locators are of unitary construction.

17. The conveyor of claim 16 wherein the spring mount locators comprise spring mounts and the pan and spring mounts are of unitary construction.

18. The conveyor of claim 17 wherein the spring mounts comprise a plurality of tabs punched from the pan and bent at an angle relative to the pan.

19. The conveyor of claim 16 wherein each of the spring locators is a dimple indented in the pan.

20. The conveyor of claim 16 wherein each of the spring locators is a hole punched in the pan.

21. A vibratory conveyor comprising:
(a) a frame;
(b) a plurality of spaced apart spring mounts carried by the frame;
(c) a pan;
(d) a plurality of precisely located and spaced apart spring mount locators formed integral with the pan;
(e) a plurality of spring mounts carried by the pan with each spring mount corresponding to and being precisely located relative to the pan by at least one of the locators; and
(f) a plurality of springs with each spring mounted at one end to one of the frame spring mounts and at its other end to one of the pan spring mounts.

22. The conveyor of claim 21 wherein each pan spring mount is formed integral with the pan.

23. The conveyor of claim 21 wherein the pan, each pan spring mount, and each spring mount locator are of unitary construction.

24. The conveyor of claim 23 wherein each pan spring mount comprises a tab formed from the pan and bent at an angle relative to the pan.

25. The vibratory conveyor of claim 24 wherein the pan is generally U-shaped comprising a bed and a pair of upraised sidewalls each having an outwardly extending wing and a downturned flange extending downwardly from the wing wherein each wing has a plurality of the spring mounting tabs with each spring mounting tab bent relative to the wing between one of the sidewalls and one of the downturned flanges.

26. The vibratory conveyor of claim 25 wherein each spring mounting tab is fixed to its adjacent sidewall and adjacent downturned flange.

27. The vibratory conveyor of claim 21 wherein the pan is generally U-shaped comprising a bed and a pair of upraised sidewalls each having an outwardly extending wing and a downturned flange extending downwardly from the wing wherein one of the sidewalls and downturned flanges have a plurality of spaced apart and indented locator dimples facing the other of the sidewalls and downturned flanges for each locating one of the spring mounts received therebetween with each of the dimples accurately located relative to the pan to locate each of the spring mounts relative to the pan.

28. The vibratory conveyor of claim 27 wherein each sidewall and adjacent downturned flange both have a plurality of spaced apart locator dimples arranged in pairs that face each other for each receiving and locating one of the spring mounts therebetween.

29. The vibratory conveyor of claim 28 wherein each spring mount comprises a generally cylindrical plug having a flat spring mounting surface with one end of the plug received in one dimple of one dimple pair and the other end of the plug received in the other dimple of the one dimple pair and each end of the plug joined to the pan by a weld.

30. The vibratory conveyor of claim 21 wherein the pan is generally U-shaped comprising a bed and a pair of upraised sidewalls each having an outwardly extending wing and a downturned flange extending downwardly from the wing wherein one of the sidewalls and adjacent downturned flanges have a plurality of spaced apart locator holes for each receiving and locating one of the spring mounts received between one of the sidewalls and adjacent downturned flanges with each of the locator holes accurately located relative to the pan to locate each of the spring mounts relative to the pan.

31. The vibratory conveyor of claim 30 wherein each sidewall and adjacent downturned flange both have a plurality of spaced apart locator holes arranged in pairs that face each other for each receiving and locating one of the spring mounts relative to the pan.

32. The vibratory conveyor of claim 30 wherein each flange has locator holes and each sidewall has no locator holes.

33. The vibratory conveyor of claim 30 wherein each locator hole has a pair of spaced apart locator notches and each pan spring mount comprises a generally cylindrical plug having a flat spring mounting surface and a pair of corners wherein each corner of the plug is received in one of the notches when the plug is received by one of the locator holes locating the plug angularly and relative to the pan.

34. The vibratory conveyor of claim 33 further comprising a weld fixing one end of each plug to one of the pan sidewalls and a weld fixing the other end of each plug to one of the downturned flanges.

35. The vibratory conveyor of claim 21 further comprising cladding covering the frame wherein the cladding has a plurality of spring mount locator holes for each locating one of the spring mounts extending outwardly from the frame.

36. A vibratory conveyor comprising:
(a) a frame;
(b) cladding covering and precisely located relative to the frame and having a plurality of precisely located spring mount locator holes formed in the cladding;
(c) a plurality of spaced apart spring mounts with each of the spring mounts received in a corresponding one of the locator holes in the cladding and fixed to the frame;
(d) a pan having a plurality of spaced apart spring mount locators formed integral with the pan;
(e) a plurality of spring mounts carried by the pan with each spring mount precisely located by and corresponding to at least one of the locators; and (f) a plurality of springs carrying the pan with each spring mounted at one end to one of the frame spring mounts and at its other end to one of the pan spring mounts.

37. A method of making a vibratory conveyor comprising:
(a) providing a support beam for forming a frame of the conveyor, a sheet of cladding, a pan blank, a plurality of spring mounts each having an end, and a plurality of springs;
(b) cutting the cladding sheet to size;
(c) punching locators in the cladding sheet;
(d) fixing the cladding sheet to the support beam;
(e) locating each spring mount by placing the end of each spring mount against the beam and in cooperation with one of the spring mount locators;
(f) fixing each spring mount to the support beam;
(g) cutting the pan blank to size;
(h) punching locators in the pan blank;
(i) forming the pan blank to impart a three dimensional contour to the pan; and
(j) mounting one end of each spring to one of the spring mounts and the other end of each spring to the pan.

38. The method of claim 37 wherein each locator punched in the cladding sheet comprises a hole completely through the cladding sheet and during step (e) the end of the spring mount is inserted into one of the locator holes in the cladding with a portion of the spring mount bearing against a portion of the hole to locate the plug relative to the cladding.

39. The method of claim 38 wherein each spring mount comprises an elongate generally cylindrical plug having a flat spring mounting surface with a pair of spaced apart corners at the plug end and each spring mount locator hole in the cladding comprises a generally D-shaped hole having a pair of spaced locator notches and during step (e) the corners of the plug end of each plug are each received in a locator notch of one of the locator holes for accurately locating the plug and accurately angularly locating the spring mounting surface of the plug.

40. The method of claim 37 wherein before step (d) the further step comprising locating the cladding sheet relative to the beam.

41. The method of claim 37 wherein during step (h) the spring mount locators comprise two rows of spaced apart spring mounting tabs are punched in the pan blank, during step (i) the pan blank is three dimensionally formed into a pan having a bed, upraised sidewalls along each side of the bed, a wing outwardly extending from each sidewall, a downturned flange extending downwardly from each wing wherein one of the rows of spring mounting tabs is integrally formed in one of the wings and the other of the rows of spring mounting tabs is integrally formed in the other of the wings.

42. The method of claim 41 during or after step (h), the step further comprising bending each spring mounting tab at an angle relative to one of the wings until each tab is disposed between one of the sidewalls and one of the downturned flanges.

43. The method of claim 42 wherein all of the spring mounting tabs are bent downwardly in unison.

44. The method of claim 42 the step further comprising fixing each bent tab to one of the sidewalls and to one of the downturned flanges.

45. The method of claim 44 wherein after each spring mounting tab is bent and during step (j), one end of each spring is mounted to one of the spring mounting tabs.

46. The method of claim 37 wherein during step (h) the spring mount locators comprise at least two rows of spaced apart dimples punched in the pan blank, during step (i) the pan blank is three dimensionally formed into a pan having a bed, upraised sidewalls along each side of the bed, a wing outwardly extending from each sidewall, a downturned flange extending downwardly from each wing wherein one of the rows of spring mount locator dimples are disposed along one of the sidewalls or flanges along one side of the bed and the other of the rows of spring mount locator dimples are disposed along the other of the sidewalls or flanges along the other side of the bed.

47. The method of claim 37 wherein during step (h) the spring mount locators comprise at least two rows of spaced apart locator holes punched in the pan blank, during step (i) the pan blank is three dimensionally formed into a pan having a bed, upraised sidewalls along each side of the bed, a wing outwardly extending from each sidewall, a downturned flange extending downwardly from each wing wherein one of the rows of spring mount locator holes are disposed along one of the sidewalls or flanges along one side of the bed and the other of the rows of spring mount locator holes are disposed along the other of the sidewalls or flanges along the other side of the bed.

48. The method of claim 47 comprising providing a plurality of generally cylindrical spring mounts for mounting the springs to the pan with each spring mount having a spring mounting surface and wherein each spring mount has a locator and each spring mount locator hole in the pan has a locator notch and after step (i) the step further comprising assembling each spring mount to the pan such that it is disposed adjacent one of the locator holes such that its locator is received in the locator notch of the hole locating the spring mount relative to the pan while angularly locating the spring mounting surface relative to the pan.

49. The method of claim 48 wherein each spring mount locator hole in the pan is generally D-shaped having a straight edge and a locator notch at each end of the straight edge and each spring mount comprises a plug of D-shaped cross section having a flat spring mounting surface and a pair of spaced apart corners wherein during assembly of each plug to the pan the flat spring mounting surface of each plug bears against the straight edge of the locator hole and each corner is received in a locator notch of the hole for locating the plug relative to the pan and angularly locating the spring mounting surface relative to the pan.

* * * * *